United States Patent
Schoofs et al.

(10) Patent No.: US 12,193,594 B2
(45) Date of Patent: Jan. 14, 2025

(54) VESSEL FOR TRANSFERRING THERMAL ENERGY TO AND INDUCING CONVECTION IN A CONTAINED FLUID

(71) Applicants: Richard J. Schoofs, Moraga, CA (US); Gregory R. Schoofs, Moraga, CA (US)

(72) Inventors: Richard J. Schoofs, Moraga, CA (US); Gregory R. Schoofs, Moraga, CA (US)

(73) Assignee: Gregory T. Schoofs, Moraga, CA (US)

( * ) Notice: Subject to any disclaimer, the term of this patent is extended or adjusted under 35 U.S.C. 154(b) by 0 days.

(21) Appl. No.: 17/814,202

(22) Filed: Jul. 21, 2022

(65) Prior Publication Data

US 2022/0361701 A1   Nov. 17, 2022

Related U.S. Application Data

(63) Continuation of application No. 17/167,669, filed on Feb. 4, 2021, now Pat. No. 11,540,658, which is a continuation of application No. 16/559,259, filed on Sep. 3, 2019, now Pat. No. 11,064,835, which is a continuation of application No. 15/934,598, filed on Mar. 23, 2018, now Pat. No. 10,398,250, which is a continuation of application No. 14/599,131, filed on
(Continued)

(51) Int. Cl.
*A47J 27/21* (2006.01)
*A47J 36/02* (2006.01)

(52) U.S. Cl.
CPC ......... *A47J 27/21166* (2013.01); *A47J 36/02* (2013.01)

(58) Field of Classification Search
CPC ..................................................... A46J 36/02

USPC .............. 126/373.1, 390.1; 90/444, 445, 447
See application file for complete search history.

(56) References Cited

U.S. PATENT DOCUMENTS

| 91,754 A | 6/1869 | Lawrence |
| 495,872 A | 4/1893 | Ball |
(Continued)

FOREIGN PATENT DOCUMENTS

JP    2001149225 A    6/2001

OTHER PUBLICATIONS

Amazon.com, Inc., "Alpine Antic Finish Encapsulated Base 18/10 Stainless Steel Whistling Tea Kettle Pot" [retrieved online from http://www.amazon.com/Alpine-Finish-Encapsulated-Stainless-Whistling/dp/B00ALOZX24 on Jan. 25, 2014].
(Continued)

*Primary Examiner* — Vivek K Shirsat
(74) *Attorney, Agent, or Firm* — Ahmann Kloke LLP

(57) ABSTRACT

An article of manufacture includes a wall portion having a wall inner surface and a wall outer surface, a base portion having a base inner surface and a base outer surface, at least a portion of the wall portion and the base portion forming a vessel to retain fluid therein, at least part of the base portion configured to receive heat, and a plurality of shaped portions with at least three sides extending above, each shaped portion of the base inner surface including at least three sides and polygonal shaped tops, each of the plurality of shaped portions capable of supplying heat from the sides to fluid adjacent to the sides, the plurality of shaped portions including the polygonal shaped tops to induce creation of a plurality of hexagonal convection cells in contact with a surface of the fluid which increases heat transfer from a heating source to the fluid.

22 Claims, 21 Drawing Sheets

Related U.S. Application Data

Jan. 16, 2015, now Pat. No. 9,968,215, which is a continuation-in-part of application No. 14/331,119, filed on Jul. 14, 2014, now abandoned.

(56) References Cited

U.S. PATENT DOCUMENTS

| | | | |
|---|---|---|---|
| 661,273 A | 11/1900 | Park | |
| 679,928 A | 8/1901 | Warren | |
| 1,460,380 A * | 7/1923 | Hughes | A47J 37/10 |
| | | | 99/425 |
| 1,707,532 A | 4/1929 | Moon | |
| 1,899,682 A | 2/1933 | Goldenberg | |
| 2,053,096 A * | 9/1936 | Wise | A47J 36/02 |
| | | | 220/573.1 |
| 3,076,405 A | 2/1963 | Lang | |
| 3,769,902 A * | 11/1973 | Hurwitz | A47J 37/0623 |
| | | | 219/401 |
| 4,204,607 A | 5/1980 | Zani | |
| 4,676,151 A | 6/1987 | Gorsuch et al. | |
| 4,724,824 A | 2/1988 | Mccoy et al. | |
| 4,926,843 A | 5/1990 | Vocke et al. | |
| 5,453,574 A | 9/1995 | Zuran et al. | |
| 5,471,731 A | 12/1995 | Welhouse | |
| 5,628,426 A | 5/1997 | Doyle et al. | |
| 7,415,922 B2 | 8/2008 | Cheng et al. | |
| 8,037,602 B2 | 10/2011 | Huang | |
| 2007/0256570 A1 | 11/2007 | Yang | |
| 2008/0223359 A1 | 9/2008 | Huang | |
| 2010/0084412 A1 | 4/2010 | Huang | |
| 2012/0090813 A1 | 4/2012 | Palumbo et al. | |
| 2013/0129890 A1 | 5/2013 | Cox | |
| 2014/0004311 A1 | 1/2014 | Alim | |
| 2015/0090725 A1 | 4/2015 | Cheng | |

OTHER PUBLICATIONS

Amazon.com, Inc., "Amazon Best Sellers: Best Teakettles" [retrieved online from http://www.amazon.com/gp/bestsellers/kitchen/289833/ref=pd_zg_hrsr_k_1_3_last on Jan. 25, 2014].

Amazon.com, Inc., "Capresso 259 H2O Plus Glass Water Kettle, Polished Chrome," available at least since Sep. 25, 2013 [retrieved online from http://www.amazon.com/Capresso-259-Kettle-Polished-Chrome/dp/B000BY4ZHO on Jan. 21, 2015].

Amazon.com, Inc., "Chantal Classic Loop Enamel-on-Steel 1.8 Quart Teakettle, Onyx," available at least since Mar. 27, 2013 [retrieved online from http://www.amazon.com/Chantal-Classic-Enamel---Steel-Teakettle/dp/B00011WOHS on Jan. 21, 2015].

Amazon.com, Inc., "Chef's Choice 6800001 Cordless Electric Glass Kettle," available at least since Jan. 2, 2013 [retrieved online from http://www.amazon.com/Chefs-Choice-6800001-Cordless-Electric/dp/B009ZZELQA on Jan. 21, 2015].

Amazon.com, Inc., "Chef's Secret® 2.75qt Surgical Stainless Steel Tea Kettle with Copper Capsule Bottom" [retrieved online from http://www.amazon.com/Chefs-Secret(R)-Surgical-Stainless-Capsule/dp/B00407HE3U on Jan. 25, 2014].

Amazon.com, Inc., "Cuisinart PTK-330 W PerfecTemp Porcelain Enameled Teakettles" [retrieved online from http://www.amazon.com/Cuisinart-PTK-330W-PerfecTemp-Porcelain-Teakettle/dp/B001D1IH2S on Jan. 25, 2014].

Amazon.com, Inc., "Lenox L-12184 SS Tea Kettle, 2.5-Quart, Green," available at least since Dec. 8, 2013 [retrieved online from http://www.amazon.com/Lenox-L-12190-Kettle-2-5-Quart-Silver/dp/B00GOYXWHY on Jan. 21, 2015].

Amazon.com, Inc., "Melitta MEK17W 1.7-Liter Express Kettle," available at least since Feb. 23, 2009 [retrieved online from http://www.amazon.com/Melitta-MEK17W-1-7-Liter-Express-Kettle/dp/B0002F56B6 on Jan. 21, 2015].

Amazon.com, Inc., "Prime Pacific Whistling Teakettle, Red" [retrieved online from http://www.amazon.com/Prime-Pacific-Whistling-Teakettle-Red/dp/B004Z0J8X6 on Jan. 2014].

Amazon.com, Inc., "Revere 2-1/3 Quart Whistling Tea Kettle" [retrieved online from http://www.amazon.com/Revere-2-1-3-Quart-Whistling-Kettle/dp/B00005B5ZV on Jan. 25, 2014].

Consumersearch, Inc., "Best Stovetop Tea Kettles," Sep. 2013 [retrieved online from http://www.consumersearch.com/tea-kettles/best-stovetop-tea-kettles on Jan. 25, 2014].

Consumersearch, Inc., "How to Buy a Tea Kettle," Sep. 2013 [retrieved online from http://www.consumersearch.com/tea-kettles/how-to-buy-a-tea-kettle on Jan. 25, 2014].

Consumersearch, Inc., "Tea Kettle Reviews," Sep. 2013 [retrieved online from http://www.consumersearch.com/tea-kettles on Jan. 25, 2014].

Consumersearch, Inc., "Revere 2-1/3-Quart Whisting Tea Kettle Review," Sep. 2013 [retrieved online from http://www.consumersearch.com/tea-kettles/revere-2-13-quart-whistling-tea-kettle on Jan. 25, 2014].

Cooking.com, Inc., "2-qt. Classic Series Monterey Whistling Tea Kettle by Farberware" [retrieved online from http://www.cooking.com/2-qt-classic-series-monterey-whistling-tea-kettle-by-farberware_136057_11/ on Jan. 25, 2014].

Cooking.com, Inc., "2-qt. Classic Series Sonoma Whistling Tea Kettle by Farberware" [retrieved online from http://www.cooking.com/2-qt-classic-series-sonoma-whistling-tea-kettle-by-farberware_598926_11/ on Jan. 25, 2014].

Cooking.com, Inc., "Best of Top Rated Teakettles & Presses" [retrieved online from http://www.cooking.com/top_teakettles-presses_45-1949-4294965335_p01 on Jan. 25, 2014].

Cooking.com, Inc., "Robin's Egg Blue 2-qt. Signature Teakettles Whistling Teakettle by Paula Deen" [retrieved online from http://www.cooking.com/robin-s-egg-blue-2-qt-signature-teakettles-whistling-teakettle-by-paula-deen on Jan. 25, 2014].

International Application No. PCT/US2015/040428, International Search Report and Written Opinion mailed Nov. 9, 2015.

International Application No. PCT/US2016/012896, International Search Report and Written Opinion mailed Jun. 2, 2016.

Kitchenkool.com, search results for "tea kettle" [retrieved online from http://www.kitchenkool.com/shopping on Jan. 25, 2014].

Master Bond Inc., "Potting and Encapsulation" [retrieved online from http://www.masterbond.com/applications/potting-and-encapsulation? on Jan. 25, 2014.].

Master Bond Inc., "EP17HT-LO Product Description" [retrieved online from http://www.masterbond.com/tds/ep17ht-lo on Jan. 25, 2014].

Overstock.com, Inc., "Alpine Green Stainless Steel Whistling Tea Kettle" [retrieved online from http://www.overstock.com/Home-Garden/Alpine-Green-Stainless-Steel-Whistling-Tea-Kettle/5224812/product.html on Jan. 25, 2014].

Overstock.com, Inc., "Alpine Stainless Steel 3-quart Whistling Tea Kettle" [retrieved online from http://www.overstock.com/Home-Garden/Alpine-Stainless-Steel-3-quart-Whistling-Tea-Kettle/5618050/product.html on Jan. 25, 2014].

Overstock.com, Inc., "Prime Pacific Copper Finish 2.8-liter (3 Quart) Stainless Steel Tea Kettle" [retrieved online from http://www.overstock.com/Home-Garden/Prime-Pacific-Copper-Finish-2.8-liter-3-Quart-Stainless-Steel-Tea-Kettle/7260878/product.html on Jan. 25, 2014].

Overstock.com, Inc., "Product Reviews: Alpine Green Stainless Steel Whistling Tea Kettle" [retrieved online from http://www.overstock.com/Home-Garden/Alpine-Green-Stainless-Steel-Whistling-Tea-Kettle/5224812/customer-reviews.html, on Jan. 25, 2014].

Sears Brands, LLC, "Revere® 2-1/3 qt. Tea Kettle—Copper Bottom" [retrieved online from http://www.sears.com/revere-reg-2-1-3-qt-tea-kettle-copper-bottom/p-00837970000P on Jan. 25, 2014].

* cited by examiner

VESSEL FOR TRANSFERRING THERMAL ENERGY TO AND INDUCING CONVECTION IN A CONTAINED FLUID

CROSS REFERENCE TO RELATED APPLICATIONS

This application is a continuation of U.S. Nonprovisional patent application Ser. No. 17/167,669, filed Feb. 4, 2021, entitled "VESSEL FOR TRANSFERRING THERMAL ENERGY TO AND INDUCING CONVECTION IN A CONTAINED FLUID," which is a continuation of U.S. Nonprovisional patent application Ser. No. 16/559,259, filed Sep. 3, 2019, entitled "VESSEL FOR TRANSFERRING THERMAL ENERGY TO AND INDUCING CONVECTION IN A CONTAINED FLUID," issued as U.S. Pat. No. 11,064,835, which is a continuation of U.S. Nonprovisional patent application Ser. No. 15/934,598 filed Mar. 23, 2018, entitled "VESSEL FOR TRANSFERRING THERMAL ENERGY TO AND INDUCING CONVECTION IN A CONTAINED FLUID," issued as U.S. Pat. No. 10,398,250, which is a continuation of U.S. Nonprovisional patent application Ser. No. 14/599,131 filed Jan. 16, 2015, entitled "VESSEL FOR TRANSFERRING THERMAL ENERGY TO AND INDUCING CONVECTION IN A CONTAINED FLUID," issued as U.S. Pat. No. 9,968,215, which is a continuation-in-part of U.S. Nonprovisional patent application Ser. No. 14/331,119 filed Jul. 14, 2014, entitled "VESSEL FOR TRANSFERRING THERMAL ENERGY TO A CONTAINED FLUID," each of which is incorporated by reference herein.

BACKGROUND

Vessels are used to contain substances such as fluids. A vessel is any hollow container including, for example, a container manufactured to hold a fluid (e.g., water, liquid, substance, or liquid/solid mixtures) and to facilitate the transfer of thermal energy to the substance (e.g., fluid) contained within. Examples of such vessels include pots, kettles, and the like.

Such vessels in the prior art such as pans or skillets typically include a flat bottom or a bottom that is indented around a perimeter of the bottom. Even with such an indentation, the bottom of such vessels is primarily flat. The bottom of the vessel is generally set against a heat source (e.g., flame or heating element). The heat source transfers thermal energy through the flat bottom of the vessel and into the fluid therein. There may be design elements or reinforcement elements on the vessel or the bottom of the vessel.

Marketing materials for vessels in the prior art tout the benefits of uniform heating. Uniform heating has merit if heating is purely by conduction (i.e., thermal diffusion), or, if the contents being heated are "fragile," in the sense that they are subject to thermal degradation.

Essentially, the same vessel has been used worldwide. Differences in vessels of the same type are generally cosmetic, based on durability, based on ergonomics, or fabricated from different material(s).

SUMMARY

An example article of manufacture comprises a wall portion having a wall inner surface and a wall outer surface, a base portion having a base inner surface and a base outer surface, at least a portion of the wall portion and the base portion forming a vessel to retain fluid therein, at least part of the base portion configured to receive heat from a heating source, and a plurality of shaped portions extending above the base inner surface or the wall inner surface, a top of each of the plurality of shaped portions being opposite a bottom of each of the plurality of shaped portions, each shaped portion of the base inner surface including at least three sides extending from the bottom to the top each of the plurality of shaped portions capable of supplying heat from the sides to fluid adjacent to the sides of at least one other shaped portion of the plurality of shaped portions, the plurality of shaped portions of the base inner surface or the wall inner surface including the polygonal shaped tops of the plurality of shaped portions and sides of the plurality of shaped portions assist in uneven heat transfer from the heating source to the fluid retained in the article of manufacture to induce a plurality of hexagonal convection cells in contact with a surface of the fluid which increases heat transfer from the heating source to the fluid.

In various embodiments, the article of manufacture is a kettle. The plurality of shaped portions of the base inner surface or the wall inner surface including the polygonal shaped tops of the plurality of shaped portions and sides of the plurality of shaped portions may assist in uneven heat transfer from the heating source to the fluid retained in the article of manufacture to induce creation of the plurality of hexagonal convection in contact with the surface of the fluid. The plurality of hexagonal convection cells may comprise or be a plurality of hexagonal convection G-cells. In various embodiments, each of the hexagonal convection cells in contact with the surface of the fluid may include upflow at the center of the cell and downflow at the periphery of the cell. The plurality of hexagonal convection cells may form a honeycomb pattern.

In some embodiments, the polygonal shaped tops are configured to provide nucleation points to assist and promote bubble nucleation for the onset of rapid boiling. The nucleation points may assist with an onset of rapid boiling and avoid or reduce superheating the fluid to avoid dangerous pressures and spills.

The plurality of shaped portions of the base inner surface or the wall inner surface including the polygonal shaped tops of the plurality of shaped portions and the sides of the shaped portions may be configured to assist in uneven heat transfer in the fluid retained within the article of manufacture and decrease time needed to heat the fluid to a desired temperature. The plurality of shaped portions of the base inner surface or the wall inner surface including the polygonal shaped tops of the plurality of shaped portions and the sides of the shaped portions may be configured to assist in creation of at least one two-armed spiral in the fluid that rotates. The plurality of shaped portions of the base inner surface or the wall inner surface including the polygonal shaped tops of the plurality of shaped portions and the sides of the shaped portions may be configured to induce one or more dislocations in the at least one two-armed spiral.

In some embodiments, each of the polygonal shaped tops of the plurality of shaped portions is hexagonal. The article of manufacture may be a pot. At least two of the plurality of shaped portions may have different heights extending above the base inner surface or the wall inner surface. In some embodiments, the base portion comprises at least two different metals. The base outer surface further may comprise one or more other shaped portions extending from the base outer surface, the one or more other shaped portions may assist in uneven heat transfer from the heating source to the fluid retained in the article of manufacture. The plurality of shaped portions of the base inner surface or the wall inner surface may be arranged in at least one circular pattern.

The plurality of shaped portions of the base inner surface or the wall inner surface may be arranged in at least one line radiating out from a center of the base inner surface. The subsets of the plurality of shaped portions may be evenly arranged. The subsets of the plurality of shaped portions may be arranged in one or more lines. In some embodiments, all or part of the heating source may be within the base portion. Alternately, in some embodiments, all or part of the heating source may be outside the base portion.

An example method comprises receiving one or more metals and forming the metals into a kettle, the kettle including a wall portion, a base portion, and a plurality of shaped portions, the wall portion having a wall inner surface and a wall outer surface, the base portion having a base inner surface and a base outer surface, at least a portion of the wall portion and the base portion forming a vessel to retain fluid therein, at least part of the base portion configured to receive heat from a heating source, and the plurality of shaped portions extending above the base inner surface or the wall inner surface, a top of each of the plurality of shaped portions being opposite a bottom of each of the plurality of shaped portions, each shaped portion of the base inner surface including at least three sides extending from the bottom to the top each of the plurality of shaped portions capable of supplying heat from the sides to fluid adjacent to the sides of at least one other shaped portion of the plurality of shaped portions, the plurality of shaped portions of the base inner surface or the wall inner surface including the polygonal shaped tops of the plurality of shaped portions and sides of the plurality of shaped portions assist in uneven heat transfer from the heating source to the fluid retained in the article of manufacture to induce creation of a plurality of hexagonal convection cells in contact with a surface of the fluid which increases heat transfer from the heating source to the fluid.

Another example article of manufacture includes a wall portion having a wall inner surface and a wall outer surface, a base portion having a base inner surface and a base outer surface, at least a portion of the wall portion and the base portion forming a vessel to retain fluid therein, at least a heating surface portion of the base outer surface positioned to receive heat from a heating source, and a plurality of shaped portions extending above the base inner surface or the wall inner surface, a top of each of the plurality of shaped portions being opposite a bottom of each of the plurality of shaped portions, each shaped portion of the base inner surface including at least three sides extending from the bottom to the top, the top of each of the plurality of shaped portions being hexagonal in shape, each of the plurality of shaped portions capable of supplying heat from the sides to fluid adjacent to the sides of at least one other shaped portion of the plurality of shaped portions, the plurality of shaped portions of the base inner surface or the wall inner surface including the hexagonal shaped tops of the plurality of shaped portions and sides of the plurality of shaped portions to assist in uneven heat transfer from the heating source to the fluid retained in the article of manufacture.

In various embodiments, wherein the article of manufacture is a kettle. At least two of the plurality of shaped portions may have different heights extending above the base inner surface or the wall inner surface. The base portion may comprise at least two different metals. Each of the plurality of shaped portions may be hexagonal in shape.

In some embodiments, subsets of the plurality of shaped portions are evenly arranged. The subsets of the plurality of shaped portions may be arranged in one or more lines. The plurality of shaped portions of the base inner surface or the wall inner surface including the hexagonal shaped tops of the plurality of shaped portions and the sides of the shaped portions may be configured to assist in uneven heat transfer in the fluid of the article of manufacture and increase a speed of boiling of the fluid.

The article of manufacture is may be a pot. The base outer surface further may comprise one or more other shaped portions extending from the base outer surface, the one or more other shaped portions to assist in uneven heat transfer from the heating source to the fluid in the article of manufacture. The plurality of shaped portions of the base inner surface or the wall inner surface including the hexagonal shaped tops of the plurality of shaped portions and the sides of the shaped portions may be configured to assist in creation of a two-armed spiral in the fluid that rotates. The plurality of shaped portions of the base inner surface or the wall inner surface including the hexagonal shaped tops of the plurality of shaped portions and the sides of the shaped portions may be configured to induce one or more dislocations in the two-armed spiral. The plurality of shaped portions of the base inner surface or the wall inner surface including the hexagonal shaped tops of the plurality of shaped portions and the sides of the shaped portions may be configured to assist in creation of a plurality of three-dimensional cells in the fluid in the article of manufacture.

In various embodiments, the plurality of shaped portions of the base inner surface or the wall inner surface including the hexagonal shaped tops of the plurality of shaped portions and the sides of the shaped portions may be configured to assist in creation of a plurality of three-dimensional cells on the surface of the fluid in the article of manufacture. The plurality of shaped portions of the base inner surface or the wall inner surface may be arranged in at least one circular pattern. The plurality of shaped portions of the base inner surface or the wall inner surface may be arranged in at least one line radiating out from a center of the base inner surface.

In some embodiments, the hexagonal shaped tops may be configured to provide nucleation points to assist and promote bubble nucleation for the onset of rapid boiling. Further, in some embodiments, the nucleation points may assist with an onset of rapid boiling and avoids superheating the fluid to avoid dangerous pressures and spills.

The hexagonal shaped tops may be configured to assist in the formation of g-cell convection cells in a surface of the fluid in the article of manufacture.

An example method comprises receiving one or more metals, forming the metals into a kettle, the kettle including a wall portion, a base portion, and a plurality of shaped portions, the wall portion having a wall inner surface and a wall outer surface, the base portion having a base inner surface and a base outer surface, at least a portion of the wall portion and the base portion forming a vessel to retain fluid therein, at least a heating surface portion of the base outer surface positioned to receive heat from a heating source, and the plurality of shaped portions extending above the base inner surface or the wall inner surface, a top of each of the plurality of shaped portions being opposite a bottom of each of the plurality of shaped portions, each shaped portion of the base inner surface including at least three sides extending from the bottom to the top, the top of each of the plurality of shaped portions being hexagonal in shape, each of the plurality of shaped portions capable of supplying heat from the sides to fluid adjacent to the sides of at least one other shaped portion of the plurality of shaped portions, the plurality of shaped portions of the base inner surface or the wall inner surface including the hexagonal shaped tops of the plurality of shaped portions and sides of the plurality of shaped portions to assist in uneven heat transfer from the heating source to the fluid in the article of manufacture.

An article of manufacture is configured to transfer thermal energy to a contained substance. This article of manufacture may be a vessel such as a kettle, pot, or pan. The substance may include a fluid, a liquid, or a mixture of a liquid and a solid. In some embodiments, the article of manufacture includes a wall portion having a wall inner surface and a wall outer surface; a base portion having a base inner surface and a base outer surface, at least a portion of the wall portion and the base portion forming a vessel to retain fluid therein, at least a heating surface portion of the base outer surface positioned to receive heat from a heating source, and at least one of: a shaped portion of the base outer surface being shaped to have substantially more surface area in thermal contact with the heating source than a flat base outer surface so as to receive additional heat from the heating source, or a shaped portion of the base inner surface shaped to have substantially more surface area in thermal contact with the fluid than a flat base inner surface to transfer additional heat from the heat source to the fluid.

In some embodiments, a shaped surface is corrugated to include a plurality of ridges and furrows. In some embodiments the ridges and furrows are shaped as a sinusoidal wave. In some embodiments, the ridges and furrows are shaped as a square wave. The ridges and furrows cause the surface area of the shaped surface to be substantially increased.

In some embodiments, a shaped surface includes a plurality of protrusions and/or indentations. In some embodiments the protrusions are shaped and positioned as sinusoidal waves. In some embodiments the plurality of protrusions are shaped and positioned as square waves. The protrusions may cause a surface area of the shaped surface to be substantially increased.

In various embodiments, the shaped portion of the base outer surface is shaped to have 1.2 or more times the surface area than the flat base outer surface. The shaped portion of the base inner surface may be shaped to have 1.2 or more times the surface area than the flat base inner surface.

These and other advantages will become apparent to those skilled in the relevant art upon a reading of the following descriptions and a study of the several examples shown in the drawings. The drawings are included for illustrative purposes and are not intended to limit possible or potential shapes, patterns, or locations of protrusions and/or indentations.

An article of manufacture includes a wall portion having a wall inner surface and a wall outer surface. The article of manufacture also includes a base portion having a base inner surface and a base outer surface. At least a portion of the wall portion and the base portion form a vessel to retain a fluid therein. The article of manufacture also has a shaped portion of the base inner surface or the wall inner surface. A first section of the shaped portion may have a first surface area in thermal contact with the fluid. A second section of the shaped portion may have a second surface area in thermal contact with the fluid. The first and second surface areas may be different thereby inducing convection within the fluid that increases heat transfer from the heat source to the fluid.

In various embodiments, the shaped portion may be corrugated, and may include a plurality of ridges and furrows. Different ridges of the plurality of ridges may have different heights. In some embodiments, different furrows of the plurality of furrows may have different depths. The plurality of ridges and furrows may be shaped as a wave, such that ridge sides of the plurality of ridges are curved towards ridge top planes of the ridges, and furrow sides of the plurality of furrows are curved towards furrow bottom planes of the furrows. A ridge of the plurality of ridges may be shaped such that a ridge cross section of the ridge exhibits reflection symmetry about a ridge axis of symmetry normal to a ridge top plane of the ridge. A furrow of the plurality of furrows may be shaped such that a furrow cross section of the furrow exhibits reflection symmetry about a furrow axis of symmetry normal to the furrow bottom plane of the furrows.

At least some of the shaped portion may include a first material and some of the shaped portion may include a second material. The first and second materials may have different thermal diffusivities.

The plurality of ridges and furrows may be shaped as a square wave, such that ridge sides of the plurality of ridges extend up to a ridge top plane of a ridge that extends across a top of the ridge, and furrow sides of the plurality of furrows extend down to a furrow bottom plane of a furrow that extends across a bottom of the furrows.

The plurality of ridges and furrows of the shaped portion may be concentrically positioned about a corresponding center of the base inner surface.

In some embodiments, the plurality of ridges and furrows of the shaped portion radiate out from a corresponding center of the base inner surface. The plurality of ridges and furrows of the shaped portion may be parallel to each other. In various embodiments, at least one of the plurality of ridges or furrows radiates out from a center of the base portion at an increasing width.

The shaped portion may include a plurality of protrusions to cause the corresponding base outer surface or the base inner surface to have substantially more surface area than a corresponding flat base outer surface or flat base inner surface. The plurality of protrusions may be positioned in an array that includes a plurality of protrusion rows and protrusion columns. The protrusions of the plurality of protrusions within at least one of a protrusion row of the plurality of protrusion rows or a protrusion column of the plurality of protrusion columns may be shaped as a wave, such that protrusion sides of the protrusions within at least one of the protrusion row or the protrusion column curve upward towards a protrusion plane at a protrusion height. The protrusions of the plurality of protrusions may exhibit reflection symmetry about a protrusion axis of symmetry normal to the protrusion plane.

In some embodiments, the protrusions of the plurality of protrusions within at least one of a protrusion row of the plurality of protrusion rows or a protrusion column of the plurality of protrusion columns are shaped as a square wave, such that protrusion sides of the protrusions within at least one of the protrusion row or the protrusion column extend upward towards a protrusion top plane, the protrusion top plane extending across protrusion tops of the protrusions within at least one of the protrusion row or the protrusion column. The plurality of protrusions may be positioned in protrusion rings that are concentrically positioned about a corresponding center of the base inner surface. The plurality of protrusions may be positioned in the corresponding base outer surface or the base inner surface in protrusion radials that radiate out from a corresponding center of the base inner surface.

The shaped portion may include a plurality of indentations to cause the corresponding base outer surface or the base inner surface to have substantially more surface area than a corresponding flat base outer surface or flat base inner surface. The indentations of the plurality of protrusions may have different indentation heights. The plurality of indentations may be positioned in an array that includes a plurality of indentations rows and indentations columns. In various embodiments, an article of manufacture comprises a wall portion having a wall inner surface and a wall outer surface, a base portion having a base inner surface and a base outer surface, at least a portion of the wall portion and the base portion forming a vessel to retain fluid therein, at least a heating surface portion of the base outer surface positioned to receive heat from a heating source, and a shaped portion of the base inner surface or the wall inner surface, with a first section of the shaped portion having a first thickness and a second section of the shaped portion having a second thickness, the first and second sections being in thermal contact with the fluid, the first and second thicknesses being different which induces convection within the fluid that increases heat transfer from the heat source to the fluid.

In some embodiments, an article of manufacture comprises a wall portion having a wall inner surface and a wall outer surface, a base portion having a base inner surface and a base outer surface, at least a portion of the wall portion and the base portion forming a vessel to retain fluid therein, at least a heating surface portion of the base outer surface positioned to receive heat from a heating source, and a shaped portion of the base inner surface or the wall inner surface, with a first section of the shaped portion having a first material and a second section of the shaped portion having a second material, the first and second sections being in thermal contact with the fluid, the first and second materials having different thermal diffusivities which induces convection within the fluid that increases heat transfer from the heat source to the fluid.

DETAILED DESCRIPTION

Figure 1:
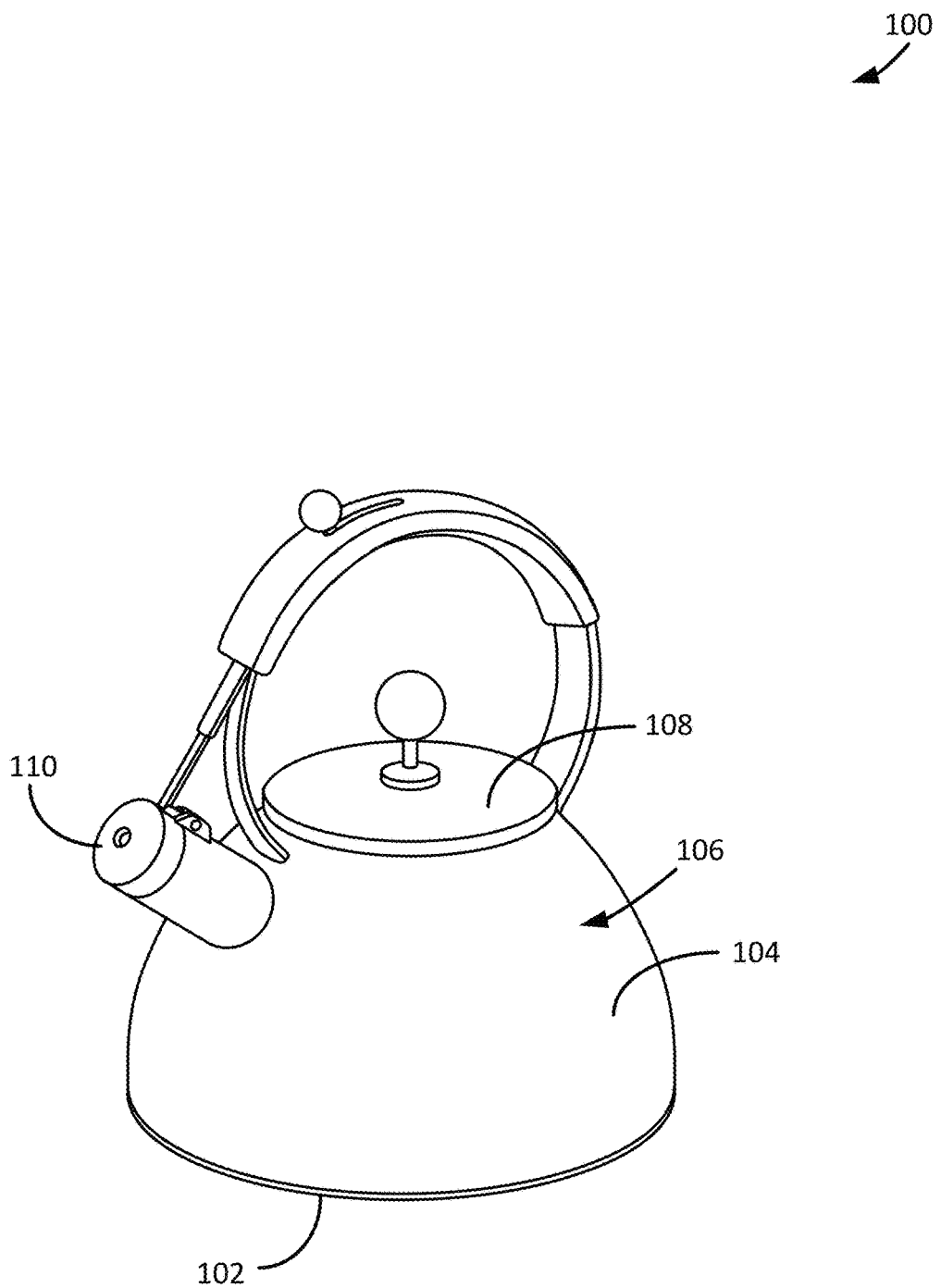
FIG. 1 depicts a perspective view of an example of a kettle for transferring thermal energy to a contained fluid such as water, a liquid, a substance, or a mixture of a liquid and a solid (e.g., soup).

FIG. 1 depicts a perspective view of an example of a kettle 100 for transferring thermal energy to a contained fluid such as water, a liquid, a substance, or a mixture of liquid and a solid (e.g., soup). While the kettle 100 is provided as one example, in other embodiments any container (e.g., a vessel) may be utilized such as, but not limited to, a pot, pan, or any other container which may hold a substance. In some embodiments, various embodiments described herein may be utilized with a cooking implement.

The kettle 100 includes a base portion 102 and a wall portion 104. The base portion 102 and the wall portion 104 may be formed from a single piece of material or, alternately, by multiple pieces of material. The kettle may be formed in any number of ways such as, for example, welding or crimping the base portion 102 to the wall portion 104. The base portion 102 and the wall portion 104 may be comprised of one or a plurality of applicable materials that may assist in containing the substance and/or transferring thermal energy from the outside of the kettle 100 to the inside of the kettle 100.

The kettle 100 may comprise any kind of material. For example, the base portion 102 and/or the wall portion 104 may comprise material such as, but not limited to, stainless steel, copper, ceramic(s), and/or the like. The base portion 102 and/or the wall portion 104 may comprise an alloy or any combination of materials. In some embodiments, the base portion 102 and the wall portion 104 may include a sandwich structure of various layers of materials. For example, the base portion 102 and/or the wall portion 104 may be clad and include a layer of copper, aluminum, or other metal(s) sandwiched between layers of steel (e.g., between layers of stainless steel).

The base portion 102 and the wall portion 104 may combine to create a vessel 106 that functions to contain a volume of a substance. In various embodiments, the kettle 100 may be referred to as a vessel or, in some embodiments, the kettle may comprise a vessel. The vessel 106 is a portion of the kettle 100 that may contain or hold the substance. In various embodiments, the kettle 100 receives heat from an external heat source and transfers heat through the base 102 to the contained substance.

In various embodiments, the base portion 102, and potentially, the wall portion 104 are in thermal contact with the substance (e.g., fluid) contained within the kettle 100. In some embodiments, the thermal contact enables thermal energy to transfer from or through the base portion 102 and/or the wall portion 104 to the contained substance (e.g., held by the vessel 106). For example, the substance is in thermal contact with the base portion 102 because the substance within the kettle 100 is in physical contact with the base portion 102 and/or wall portion 104. In transferring thermal energy to the contained substance, the base portion 102 and/or the wall portion 104 may, in some embodiments, absorb thermal energy from a thermal energy source (e.g., fire, heating element, or the like such as, but not limited to, electric, ceramic, halogen, gas, hydrocarbon(s), or induction heating elements). Further in transferring thermal energy to a contained substance, the base portion 102 and/or the wall portion 104 can transfer energy absorbed from the thermal energy source to the contained substance. It will be appreciated that the thermal energy source may be external to the kettle 100 (e.g., a stove or fire). In another example, the thermal energy source may be internal to the kettle 100 (e.g., an electric kettle or any other electrically heated vessel).

In an example of operation, the base portion 102 and/or the wall portion 104 may absorb thermal energy from many different types of thermal energy sources. In various embodiments, the base portion 102 and/or wall portion 104 may receive thermal energy from, but not limited to, conduction, convection, induction, or radiation heating. Additionally, the base portion 102 and/or the wall portion 104 can transfer absorbed thermal energy to the contained substance and/or facilitate convection in the contained substance.

The kettle 100 includes a receiving aperture 108. The receiving aperture 108 is an opening through which the substance (e.g., fluid such as a liquid, or mixture of a liquid and a solid) may be passed out of and/or into the vessel 106. In some embodiments, once the substance is contained within the vessel 106, thermal energy can be transferred from the external heating source through the base portion 102 and/or the wall portion 104.

The kettle 100 includes a dispensing aperture 110. The dispensing aperture 110 is an opening through which the substance may be passed out from the vessel 106. The dispensing aperture 110 may be shaped to allow for the pouring of the substance. In some embodiments, the dispensing aperture 110 passes heated fluid after a desired amount of thermal energy is transferred to the fluid. For example, the dispensing aperture 110 may be used to pass a contained liquid out of the vessel 106 after enough thermal energy is transferred to the liquid contained within the vessel 106 to cause the liquid to boil, or to cause the liquid to reach a desired temperature.

Figure 2A:
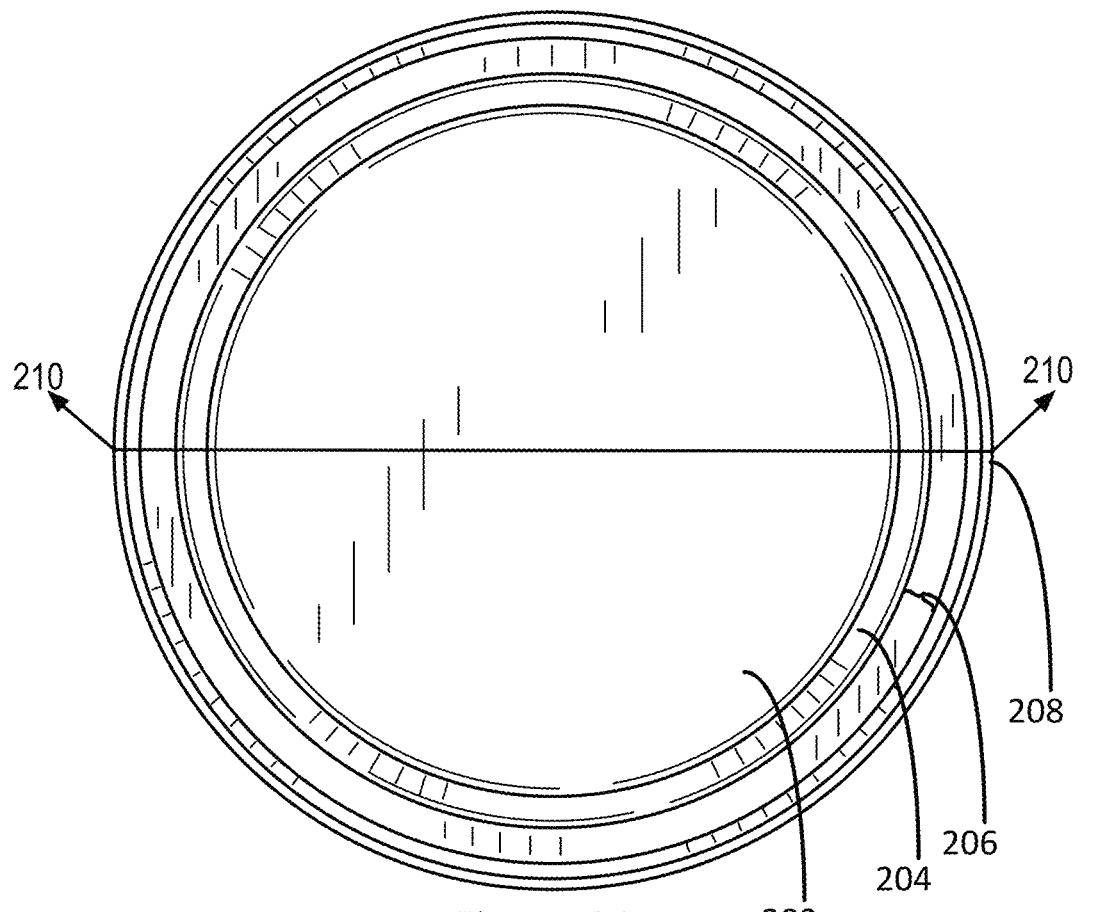
FIG. 2A is a planar view of an example kettle bottom surface with a cavity defined between an edge of the base of the kettle and a thick metal encapsulated base in the prior art.

FIG. 2A is a planar view of an example kettle bottom surface with a cavity defined between an edge 208 of the base of the kettle and a thick metal encapsulated base 202 in the prior art. In the prior art, some kettles include a thick aluminum encapsulated base (or other encapsulated metal) for uniform or even heating. In this example, the thick metal encapsulated base 202 is flat and is a major portion (e.g., a predominant portion) of the bottom of the kettle. An encapsulated base edge 204 and edge 208 of the kettle may define a cavity 206 along the rim of the base of the kettle. A diameter 210 is a diameter of the base of the kettle.

The edge 208 may allow for the thick metal encapsulated base 202 to be coupled to the bottom of the kettle. The edge 208 and cavity 206 may also help capture the edge of stove flames to entrap heat. Although there is an increase in surface area, the increase in heat transfer is nominal because the increase in the surface area is nominal.

Figure 2B:
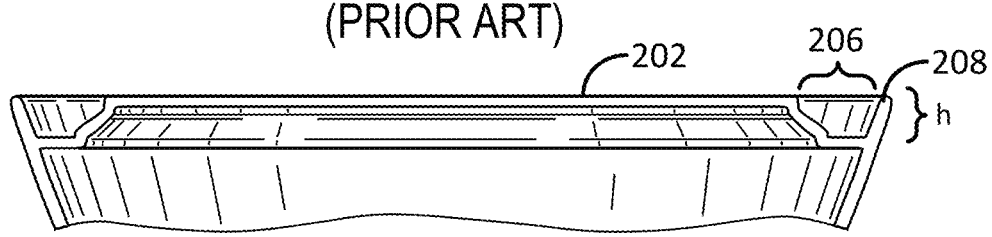
FIG. 2B is a cross section view of an example kettle bottom surface with a cavity defined between an edge of the base of the kettle and a thick metal encapsulated base in the prior art.

FIG. 2B is a cross section view of an example kettle bottom surface with a cavity 206 defined between an edge 208 of the kettle and a thick metal encapsulated base 202 in the prior art. In this cross-sectional view, the cavity 206 is shown between the edge 208 of the kettle and the encapsulated base 202. As can be seen, there is not a substantial or significant increase in surface area of the bottom when compared to a kettle with a flat bottom.

Figure 2C:
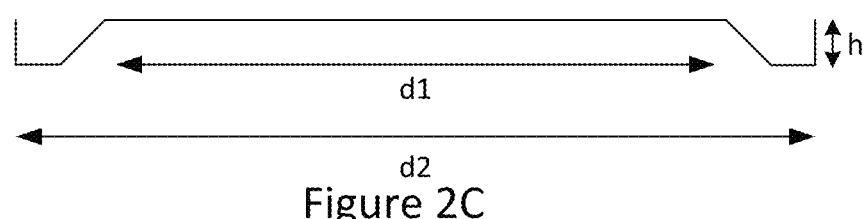
FIG. 2C includes dimensions for the cross section view of FIG. 2B.

FIG. 2C includes dimensions for the cross section view of FIG. 2B. Here, dimension "d1" represents the diameter of the thick metal encapsulated base 202. Dimension "d2" represents the diameter of the base of the kettle (e.g., diameter 210). Dimension "h" represents the distance that the thick metal encapsulated base 202 extends perpendicularly from the base of the periphery of the kettle. Given these dimensions, the increase in surface area for the kettle bottom surface in FIG. 2C relative to a kettle with a flat bottom surface is:

$$\Delta \text{ area} = (\text{area of this example kettle bottom surface}) - $$

$$(\text{area if the kettle bottom surface was flat})$$

With the dimensions shown in FIG. 2C:

$$\Delta \text{ area} = (\pi)(h)\left(d2 + \left(\left(\frac{\sqrt{2}}{2}\right) - 1\right)(d1) + \left(\sqrt{2} - 1\right)(h)\right)$$

The percentage increase in the surface area for this example kettle bottom surface relative to the surface area if the kettle bottom surface was flat equals:

(100%)(Δarea)/(area if the kettle bottom surface was flat)

For example, using the dimensions as labeled in FIG. 2C, a kettle with approximate dimensions of d1=7 inch, d2=9 inch, and h=¼ inch, will have a percentage increase in the surface area of approximately ten percent (e.g., 10%) relative to a kettle with a flat bottom. This percentage increase in the surface area (of this kettle in the prior art) is nominal, and it does not significantly or appreciably increase the surface area (relative to a flat bottom surface) such that the thermal transfer would also significantly or appreciably increase.

Figure 3:
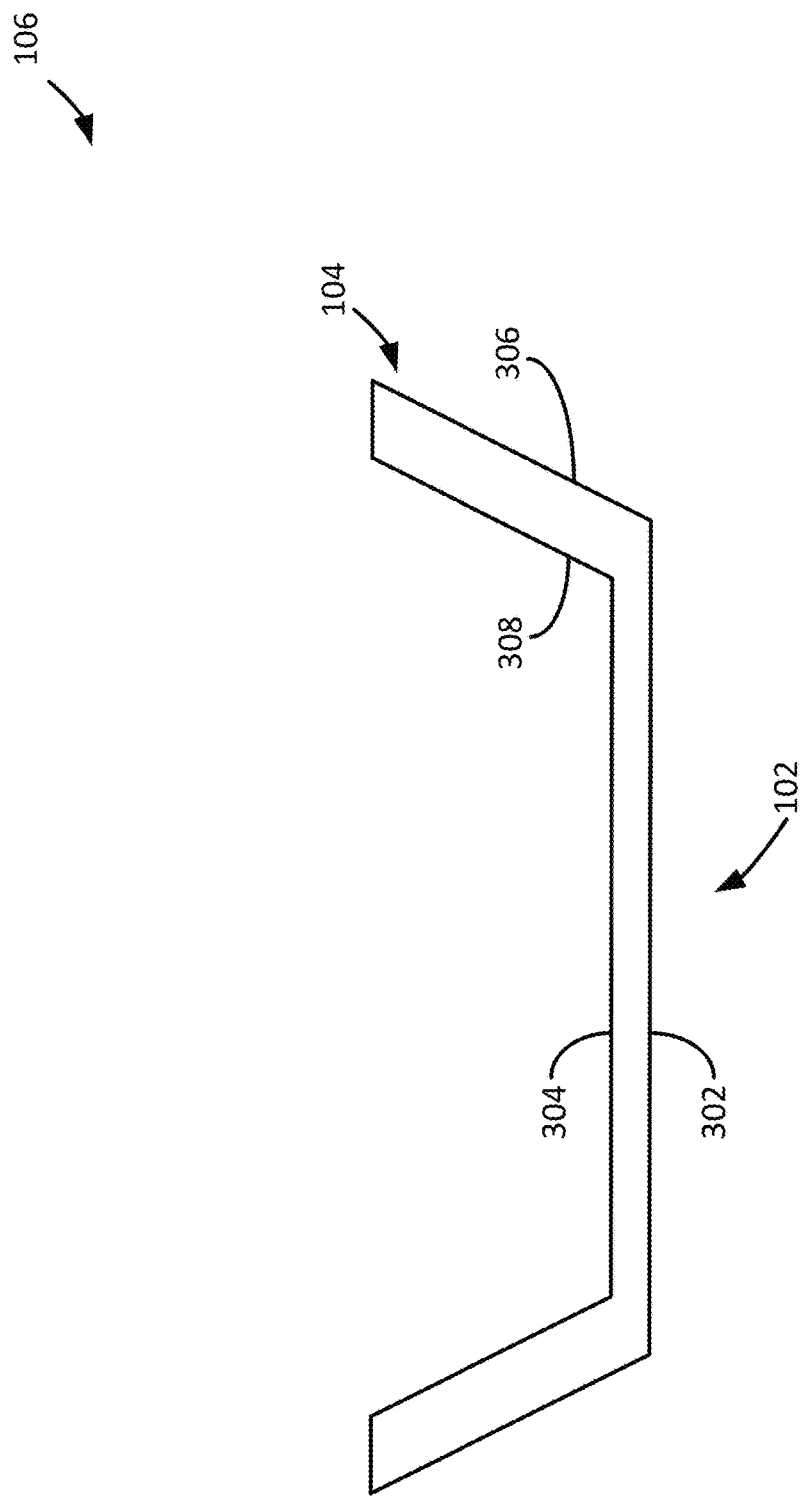
FIG. 3 is a cross sectional view of a vessel (e.g., a portion of the kettle) in some embodiments.

FIG. 3 is a cross sectional view of a vessel 106 (e.g., a portion of the kettle 100) in some embodiments. The vessel 106 is formed by a base portion 102 and a wall portion 104. The base portion 102 includes a base outer surface 302 and a base inner surface 304. The base outer surface 302 is the surface opposite of the base inner surface 304.

In various embodiments, the base outer surface 302 is the surface of the base portion 102 through which thermal energy is received from the thermal energy source. The base outer surface 302 may include a heating surface portion that receives and absorbs heat from the thermal energy source. The base inner surface 304 is the surface of the base portion 102 through which absorbed thermal energy may be transferred to the contained substance (e.g., a fluid contained or held within the vessel 106). Thus, the base portion 102 may be thermally coupled to the substance contained within the vessel 106 through the base inner surface 304. In various embodiments, the base inner surface 304 may physically contact at least some of the substance contained within the vessel 106, and thereby be thermally coupled to the substance contained within the vessel 106.

In some embodiments, at least one of the base outer surface 302 and/or the base inner surface 304 includes a shaped portion. A shaped portion of the base outer surface 302 or the base inner surface 304 is shaped such that there is substantially more surface area when compared to a flat surface. A shaped portion of the base outer surface 302 may include, for example, raised rectangular ridges, raised sinusoidal ridges, raised rectangular ridges, posts, raised portions, protrusions, indentations, or the like of any size or shape. A shaped portion may include raised portions of a surface, depressed portions in the surface, or a combination of raised portions and depressed portions (e.g., a combination of protrusions and indentations) of the surface. Substantially more surface area may, for example, include 1.2 or more times (e.g., 1.5 times or more, 2 times or more, 3 times or more, or the like) of a surface area when compared to the surface area of a flat surface. Examples of shaped portions with substantially increased surface area (in comparison with a flat surface), are described herein. In various embodiments, only a portion of the base outer surface 302 and/or the base inner surface 304 includes shaped portions.

The wall portion 104 includes a wall outer surface 306 and a wall inner surface 308. The wall outer surface 306 is opposite the wall inner surface 308. In some embodiments, all or a portion of the wall outer surface 306 may receive thermal energy from the thermal energy source. A portion of the wall inner surface 308 may transfer thermal energy from the wall outer surface 306 to the contained fluid. Thus, a portion of the wall portion 104 may be thermally coupled to the contained fluid. In various embodiments, the wall inner surface 308 may physically contact at least some of the fluid contained within the vessel 106, and thereby be thermally coupled to the substance contained within the vessel 106.

In some embodiments, at least a portion of the wall outer surface 306 and/or at least a portion of the wall inner surface 308 include a shaped portion. A shaped portion of the wall outer surface 306 or the wall inner surface 308 is shaped such that the shaped portion has substantially more surface area than if the shaped portion of the corresponding wall outer surface 306 or wall inner surface 308 was flat.

A shaped portion of the wall outer surface 306 and/or the shaped portion of the wall inner surface 308 may include, for example, raised sinusoidal ridges, raised rectangular ridges, indented sinusoidal furrows, indented rectangular ridges, posts raised portions, depressed portions, protrusions, indentations, or the like of any size or shape. A shaped portion may include raised portions of a surface, depressions in the surface, or a combination of raised portions and depressed portions (e.g., a combination of protrusions and indentations) of the surface. Examples of shaped portions with substantially increased surface area (in comparison with a flat surface), are described herein. In various embodiments, only a portion or the entire wall outer surface 306 and/or only a portion of the wall inner surface 308 includes a shaped portion.

A base inner surface 304 and/or a wall inner surface 308 with substantially more surface area than a flat corresponding portion will increase the rate at which thermal energy is transferred to a substance contained within the vessel 106 (e.g., substantially increased). For example, the rate that thermal energy is transferred to the volume of substance may be directly proportional to the surface area of the volume of fluid in thermal contact with the heated surface(s) (e.g., wall inner surface 308 and/or base inner surface 304). Increasing the surface area of the base inner surface 304 of the base portion 102, and/or the wall inner surface 308 (e.g., with protrusions, ridges, fins, furrows, indentations, and/or the like) increases the surface area of contact between a contained substance in the vessel 106 and at least a portion of the base inner surface 304 and/or at least a portion of the wall inner surface 308. Due to the (e.g., substantially) increased surface area between the substance and the base inner surface 304 and/or the wall inner surface 308, the rate of heat transfer from the thermal energy source (e.g., from a heat source via the base outer surface 302) to the substance contained in the vessel 106 may be (e.g., substantially) increased.

Similarly, increasing the surface area of the base outer surface 302 of the base portion 102, and/or the wall outer surface 306 (e.g., with protrusions, ridges, fins, indentations, and/or the like of any size or shape) may increase the surface area of contact between the thermal energy provided by the heat source and at least a portion of the base outer surface 302 of the base portion 102, and/or the wall outer surface 306. Due to the (e.g., substantially) increased surface area between the thermal energy of the heat source and the base outer surface 302 and/or the wall outer surface 306, the rate of heat transfer from the thermal energy source (e.g., from a heat source via the base outer surface 302 and/or the wall outer surface 306) to the substance contained in the vessel 106 may be (e.g., substantially) increased.

Increasing the amount of thermal energy that is absorbed by, or increasing the amount of thermal energy which transfers through, or increasing the flux of thermal energy which transfers through, or increasing the rate at which thermal energy transfers through at least a portion of the base portion 102 and/or at least a portion of the wall portion 104 may increase the temperature difference between the base portion 102 and/or the wall portion 104 and a substance contained within the vessel 106. Increasing the temperature difference between at least a portion of the base portion 102 and/or at least a portion of the wall portion 104 relative to a substance contained within the vessel 106 may lead to an increased rate at which thermal energy is transferred from the base portion 102 and/or the wall portion 104 to the substance. As a result of increasing the rate at which thermal energy is transferred from the base portion 102 and/or the wall portion 104 to the substance contained within the vessel 106, more thermal energy is transferred to the substance during a specific (e.g., limited) amount of time. In one example, a fluid may boil faster as a result of the (e.g., substantially) increased surface area(s) of the base portion 102 and wall portion 104.

In some embodiments, in configuring a portion of a base inner surface 304 and/or a wall inner surface 308 to be shaped to have more surface area than a corresponding portion of the surface that is flat, a greater amount of thermal energy is transferred from a heat source to a substance contained within the vessel 106. Increasing the surface area of the base inner surface 304 and/or the wall inner surface 308 may increase the amount of surface area that is in thermal contact with a substance contained within the vessel 106. As a result of increasing the amount of surface area that is in thermal contact with a substance contained within the vessel 106 and/or in thermal contact with a heat source, an increased amount of thermal energy may be absorbed by, or otherwise transferred to, the substance during a specific (e.g., limited) amount of time.

It will be appreciated that the thermal energy source may be external (i.e., separate) to the vessel 106. For example, the thermal energy source may be a fire or heating element on a stove. In this example, the thermal energy source (or a component of the thermal energy source) may not be integral to, fixed to, or permanently attached to the vessel 106. In some embodiments, the thermal energy source may be configured or arrayed within a horizontal zone below the vessel 106.

In some embodiments, the thermal energy source may be internal to the vessel 106 (e.g., contained within the base of the vessel 106). For example the thermal energy source may be between the base outer surface 306 and the base inner surface 304. In this example, the thermal energy source may be internal to the vessel 106 and receive power from an electrical source coupled to the vessel 106 (e.g., through a cable, stand, or plate).

The vessel 106 may be any shape. In some embodiments, the sides of the vessel 106 form a polygon with any number of sides. For example, the sides of the vessel 106 may form a hexagon. All or some of the sides of the vessel 106 may be rounded or angular.

Although FIGS. 4-14 depict patterns of protrusions and indentations (e.g., ridges and furrows), the pattern of protrusions and indentations may not, or need not, be uniform. For example, a shaped surface may comprise a random assortment of any shapes (e.g., a random assortment of protrusions and/or indentations) to increase surface area. In one example, the random assortment increases the surface area by at least 1.2 times (or more) relative to the surface area of a flat surface. In other examples, the random assortment increases the surface area by at least 1.5 times or more, 2 times or more, 3 times or more, or the like relative to the surface area of a flat surface. All or a part of a surface (e.g., base outer surface 302, base inner surface 304, wall outer surface 306, or wall inner surface 308) may comprise patterns, random assortments, or a combination of patterns and random assortments of shapes.

Further, although FIGS. 4-14 depict patterns of protrusions and indentations, the protrusions and/or indentations (e.g., ridges, furrows, corrugations, or the like) may include any number of geometric shapes or forms of any size or shape. Width, depth, and/or other defining measurement(s) of protrusions and/or indentations may vary over any trajectory and/or may vary with respect to other protrusions and/or indentations that are formed on the inner or outer surfaces of the kettle 106.

Figure 4:
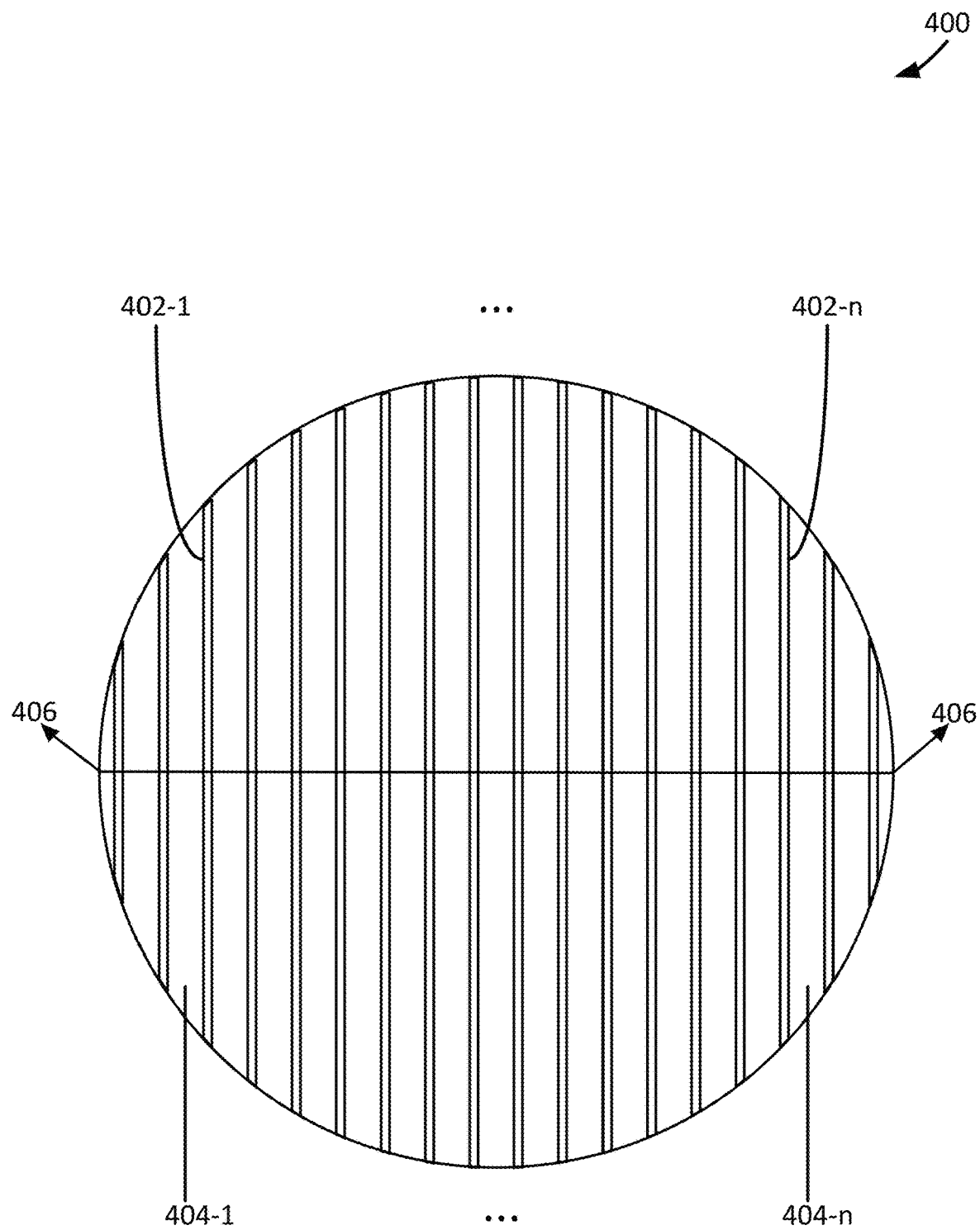
FIG. 4 is a planar view of an example shaped surface that is corrugated according to an example pattern.

FIG. 4 is a planar view of an example shaped surface 400 that is corrugated according to an example pattern. In various embodiments, all or a portion of the base inner surface 304, the base outer surface 302, the wall inner surface 308, an/or the wall outer surface 306, may be shaped according to at least a portion of the shaped surface 400 shown in FIG. 4.

The shaped surface 400 includes a plurality of ridges 402-1 ... 402-n (hereinafter referred to as "ridges 402") and furrows 404-1 ... 404-n (hereinafter referred to as "furrows 404"). By including ridges 402 and furrows 404, the surface area of the shaped surface 400 is increased over the surface area of a flat surface having the same diameter 406 that the shaped surface 400 has.

One or more of the ridges 402 may include portions that extend from the surface and one or more of the furrows 404 may be the lowest portion (e.g., at the bottom or in the surface such as an indentation) of the shaped surface 400. In some embodiments, the shaped surface 400 has a surface area that is at least 1.2 times greater or more than if the bottom of the kettle was flat. In various embodiments, the shaped surface 400 has a surface area that is at least two times greater than if the shaped surface 400 was flat. In some embodiments, the shaped surface 400 has a surface area that is at least three times greater than if the bottom of the kettle 100 was flat. In some embodiments, the ridges 402 and the furrows 404, in the example pattern shown in FIG. 4, are parallel to each other. In various embodiments, all or some of the ridges 402 and the furrows 404 may, or may not, be parallel to each other.

In some embodiments, adjacent ridges 402 and furrows 404 are shaped as a sinusoidal wave. In being shaped as a sinusoidal wave, ridge sides of the ridges 402 are curved towards ridge top planes at the top of the ridges 402. The ridge top plane is a hypothetical flat surface which contains the top of each ridge 402. For example, the ridge top plane may be a tangential plane containing the peak (e.g., highest amplitude value) point of one, all, some, or most ridges 402. In some embodiments, the period, amplitude, phase angle, and/or symmetry of different portions of any number of the sinusoidal waves may vary.

Additionally, in being shaped as a sinusoidal wave, furrow sides of the furrows 404 are curved towards furrow bottom planes at the bottom of the furrows 404. The furrow bottom plane is a hypothetical flat surface which contains the bottom of each furrow 404. For example, the furrow bottom plane may be a tangential plane containing the trough (e.g., lowest amplitude value) point of all, some, or most furrows 404.

In some embodiments, adjacent ridges 402 and furrows 404 are shaped as a square wave. In being shaped as a square wave, the top portion of each of the ridges 402 (e.g., highest amplitude value) may be in a tangential plane (e.g., a ridge top plane). Similarly, bottom portions of each of the furrows 404 (e.g., lowest amplitude value) may be in a tangential plane (e.g., a furrow bottom plane). In various embodiments, the period, amplitude, phase angle, and/or symmetry of any portion of any or all of the square waves may vary.

In various embodiments, regardless if the shaped portion is sinusoidal, is rectangular wave shaped, includes posts, includes protrusions, includes indentations, and/or the like, one, some, or all of the shaped portions (e.g., ridges 402) may have different heights (e.g., may have different highest amplitude values) whereby not all of the peaks (e.g., top portions) of the shaped portions may be in a plane. Similarly, one, some, or all of the shaped portions (e.g., furrows 404) may have different troughs (e.g., may have different lowest amplitude values) whereby not all of the lowest point of the shaped portions may be in a plane. In various embodiments, symmetry of any or all of the shaped surface (e.g., any or all of the posts, waves, protrusions, and/or indentations) may vary.

Although FIG. 4 depicts eighteen (18) parallel shaped portions 400, there may be any number of shaped portions that may be parallel, partially parallel, or not parallel. It will be appreciated that there may be any number of shaped portions 400 (including high portions and low portions of any shape or combination of shapes), and the shaped portions 400 may vary in their size(s).

Figure 5:
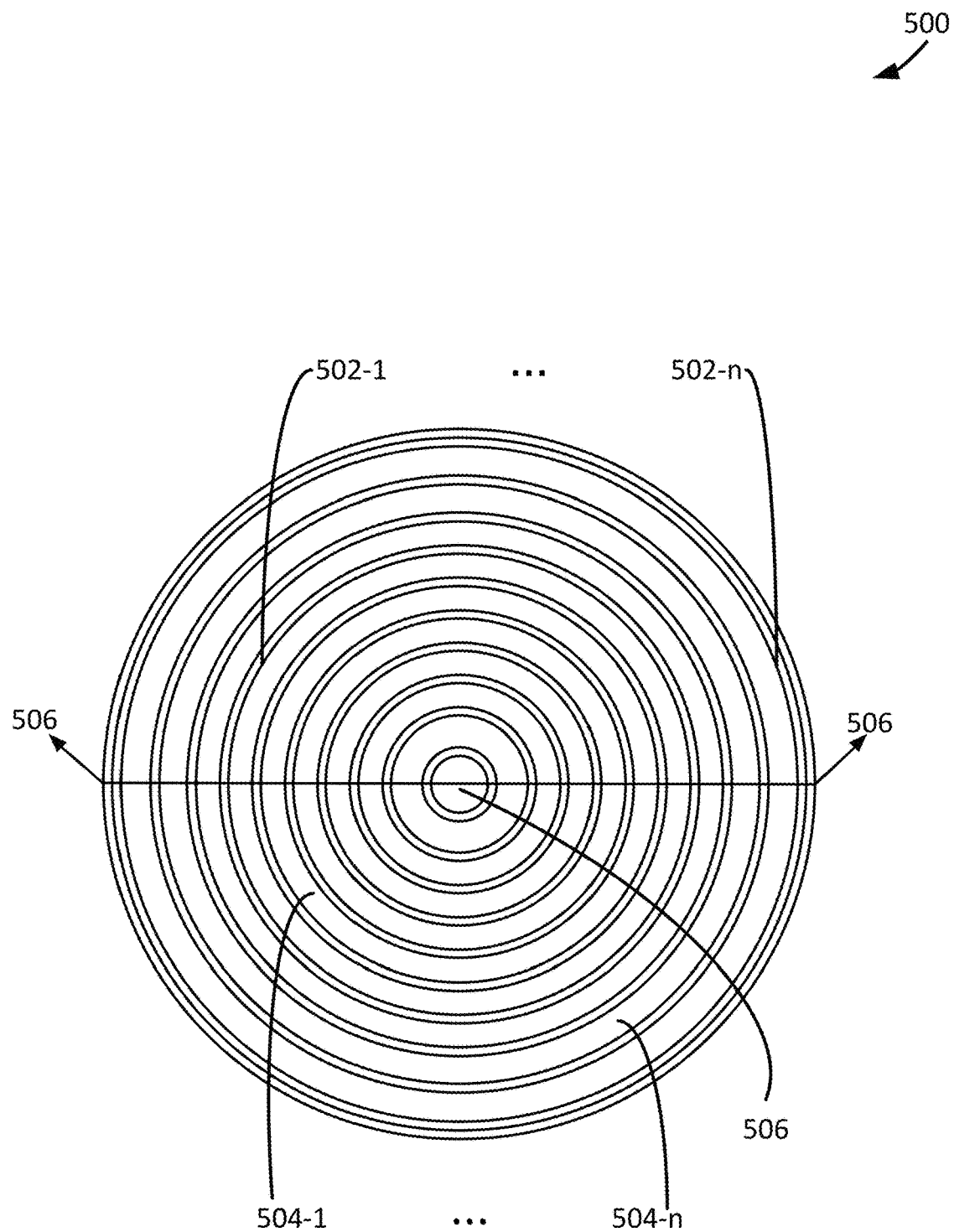
FIG. 5 is a planar view of an example shaped surface that is corrugated according to another example pattern.

FIG. 5 is a planar view of an example shaped surface 500 that is corrugated according to another example pattern. In various embodiments, an applicable combination of all or a portion of a base inner surface, and all or a portion of a base outer surface may be shaped according to the shaped surface 500 shown in FIG. 5.

The shaped surface 500 includes a plurality of ridges 502-1 . . . 502-n (hereinafter referred to as "ridges 502") and furrows 504-1 . . . 504-n (hereinafter referred to as "furrows 504"). In including ridges 502 and furrows 504, the surface area of the shaped surface 500 is increased over a surface area of a flat surface of the same size as the shaped surface 500. In some embodiments, the shaped surface 500 has a surface area that can be at least 1.2 times or greater than if the shaped surface 500 was flat. In various embodiments, the shaped surface 500 has a surface area that can be at least two times or greater than if the shaped surface 500 was flat. In another embodiment, the shaped surface 500 has a surface area that can be at least three times or greater than if the shaped surface 500 was flat.

The ridges 502 and the furrows 504 are arranged adjacent to each other concentrically about a pattern center 506 of the shaped surface 500. The pattern center 506 can be the center of the base outer surface 302 or the center of a base inner surface 304 depending on which surface of the base is patterned according to the shaped surface 500 shown in FIG. 5. In some embodiments, one or more pattern center(s) 506 may originate anywhere on the base outer surface 302, the base inner surface 304, wall outer surface 306, and/or wall inner surface 308.

In some embodiments, the ridges 502 and the furrows 504 can be shaped as a sinusoidal wave, as discussed with respect to FIG. 4. In another embodiment, the ridges 502 and the furrows 504 can be shaped as a square wave, as discussed above with respect to FIG. 4.

Although FIG. 5 depicts ten (10) concentric circles, there may be any number of concentric circles or partially concentric circles. It will be appreciated that there may be any number of shaped portions (including high portions and low portions of any shape or combination of shapes), and the shaped portions may vary in their size(s).

Figure 6:
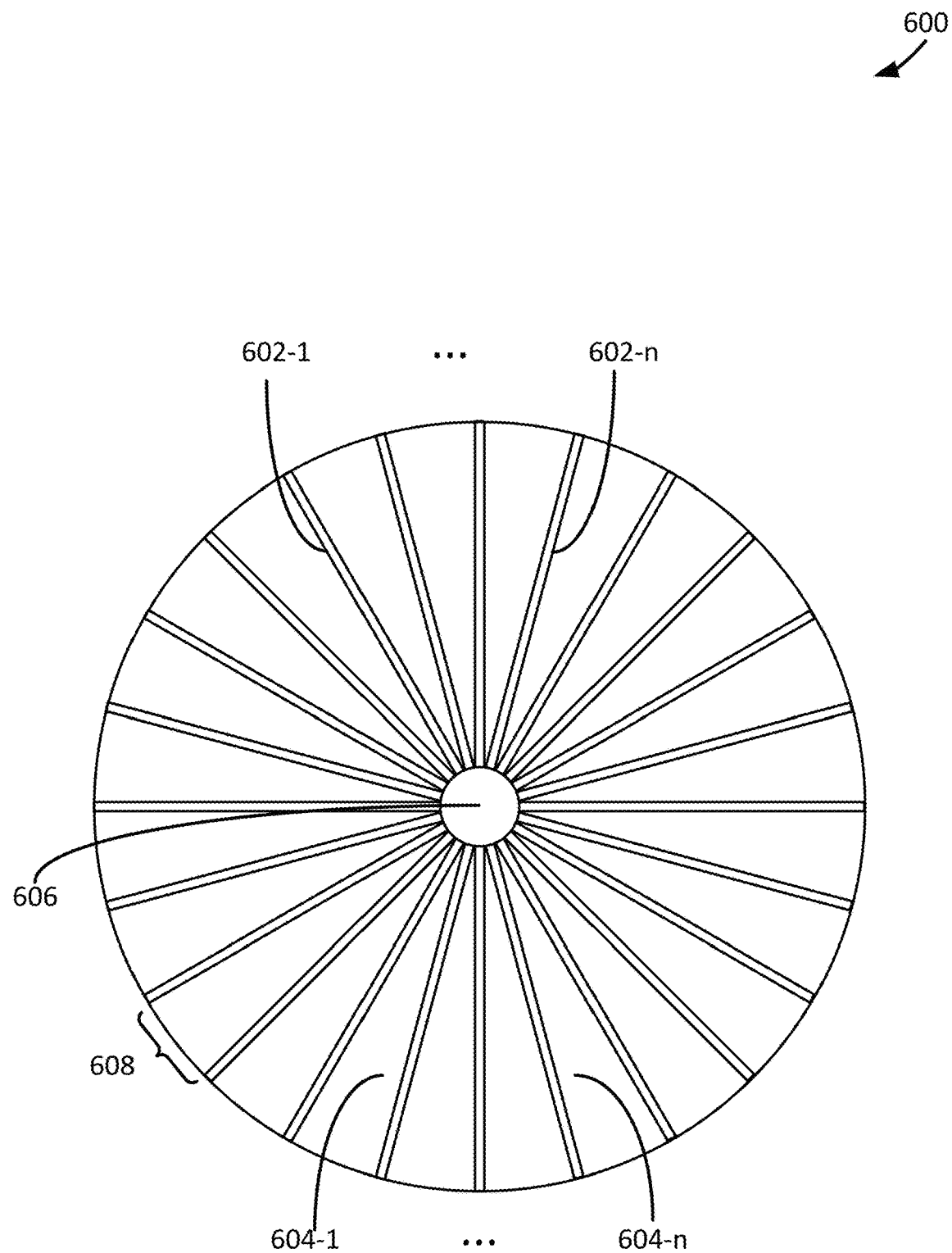
FIG. 6 is a planar view of an example shaped surface that is corrugated according to another example pattern.

FIG. 6 is a planar view of an example shaped surface 600 that is corrugated according to another example pattern. In various embodiments, an applicable combination of all or a portion of a base inner surface and/or all or a portion of a base outer surface may be shaped according to the shaped surface 600 shown in FIG. 6.

The shaped surface 600 includes a plurality of ridges 602-1 . . . 602-n (hereinafter referred to as "ridges 602") and furrows 604-1 . . . 604-n (hereinafter referred to as "furrows 604"). In including ridges 602 and furrows 604, the surface area of the shaped surface 600 is increased over a surface area of a flat surface of the same size as the shaped surface 600. In some embodiments, the shaped surface 600 has a surface area that can be at least 1.2 times or greater than if the shaped surface 600 was flat. In another embodiment, the shaped surface 600 has a surface area that can be at least two times or greater than if the shaped surface 600 was flat. In another embodiment, the shaped surface 600 has a surface area that can be at least three times or greater than if the shaped surface 600 was flat. The ridges 602 and the furrows 604 radiate out from a pattern center 606. The pattern center 606 can be the center, or originate at one or more points distant from the center, of the base outer surface 302 or the base inner surface 304 depending on which surface of the base is patterned according to the shaped surface 600 shown in FIG. 6. In the pattern shown in FIG. 6, the furrows 604 increase in furrow width 608 as the furrow extends out from the pattern center 606. In other embodiments, a ridge width of a ridge can increase as the ridge extends out from the pattern center 606.

In various embodiments, different patterns may include different pattern centers any of which may be different than the center of a bottom outer surface 302 and/or the center of a bottom inner surface 304 (e.g., pattern center 606 in FIG. 6). For example, a bottom outer surface 302 may include any number of pattern centers located next to each other, each pattern center including its own center. Any number of shaped surfaces may be oriented in any manner. As a result, each pattern and/or combination of patterns of shaped surfaces may be oriented around any number of pattern centers.

In some embodiments, the ridges 602 and furrows 604 can be shaped as a sinusoidal wave, as discussed with respect to FIG. 4. In various embodiments, the ridges 602 and furrows 604 may be shaped as half circles. In another embodiment, the ridges 602 and the furrows 604 can be shaped as a square wave, as discussed with respect to FIG. 4.

Although FIG. 6 depicts twenty four (24) shaped portions radiating from a center, there may be any number of shaped portions radiating form the center. It will be appreciated that there may be any number of shaped portions (including high portions and low portions of any shape or combination of shapes), and the shaped portions may vary in their size(s).

Figure 7A:
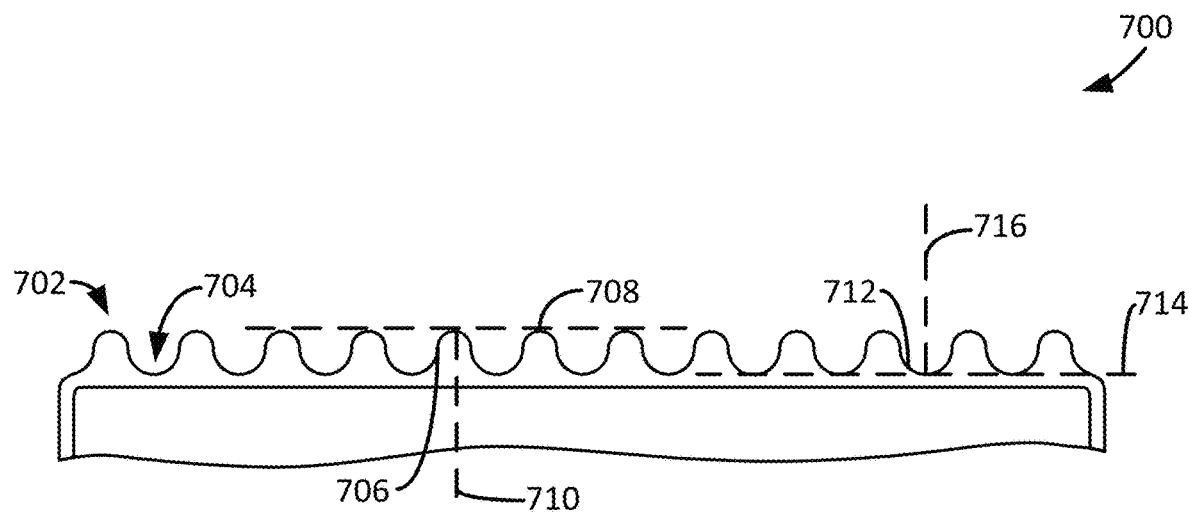
FIG. 7A is a cross-sectional view of a shaped surface that includes ridges and furrows shaped according to a sinusoidal wave.

FIG. 7A is a cross-sectional view of a shaped surface 700 that includes ridges 702 and furrows 704 shaped according to a sinusoidal wave. The shaped surface 700 shown in FIG. 7A can be formed in accordance with the example patterns shown in FIGS. 4-6. The shaped surface 700 can be formed on any combination of a base inner surface 304, a base outer surface 302, a wall inner surface 308, and a wall outer surface 306. In some embodiments, the shaped surface 700 shown in FIG. 7A has at least 2 times greater surface area (e.g., at least 2.3 times greater surface area) than the surface area of a flat surface.

The ridges 702 include ridge sides 706 that are curved towards a ridge top plane 708 (e.g., a plane tangent to the peaks of the sinusoidal waves). In an embodiment, the ridges 702 can be shaped such that a cross section of a ridge of the ridges 702 exhibits reflection symmetry about a ridge axis of symmetry 710 that is normal to the ridge top plane 708.

The furrows 704 include furrow sides 712 that are curved towards a furrow bottom plane 714 (e.g., a plane tangent to the troughs of the sinusoidal waves). In an embodiment, the furrows 704 can be shaped such that a cross section of a furrow of the furrows 704 exhibits reflection symmetry about a furrow axis of symmetry 716 that is normal to the furrow bottom plane 714.

An example function of heat transfer is as follows, where "U" is the heat transfer coefficient, "Area" is the area for which the heat is transferred to the substance, and "ΔT" is the difference in temperature (e.g., between a solid surface such as a portion of the kettle 100 and a contained liquid):

$$Q=(U)(\text{Area})(\Delta T)$$

Here, "Q" has units of energy per time (e.g., Joules per second).

In various embodiments, an arc length for a sinusoidal wave is defined as follows. Assuming the sinusoidal wave includes component a, where a=peak amplitude (measured from the zero crossings) and $2\pi/b$=period of the sinusoidal wave:

$$y = a \sin bx$$

$$\frac{dy}{dx} = ab \cos bx$$

$$\text{Arc Length} = S = 2\int_0^{\frac{\pi}{b}} \sqrt{1+\left(\frac{dy}{dx}\right)^2}\, dx = S = 2\int_0^{\frac{\pi}{b}} \sqrt{1+a^2b^2\cos^2(bx)}\, dx$$

Assuming a=π and b=1 then:

$$S=2\int_0^\pi \sqrt{1+\pi^2\cos^2(x)}\, dx$$

$$S=2(7.21403)=14.482$$

Assuming unit width, the area equals (S)(1) or S.

Figure 7B:
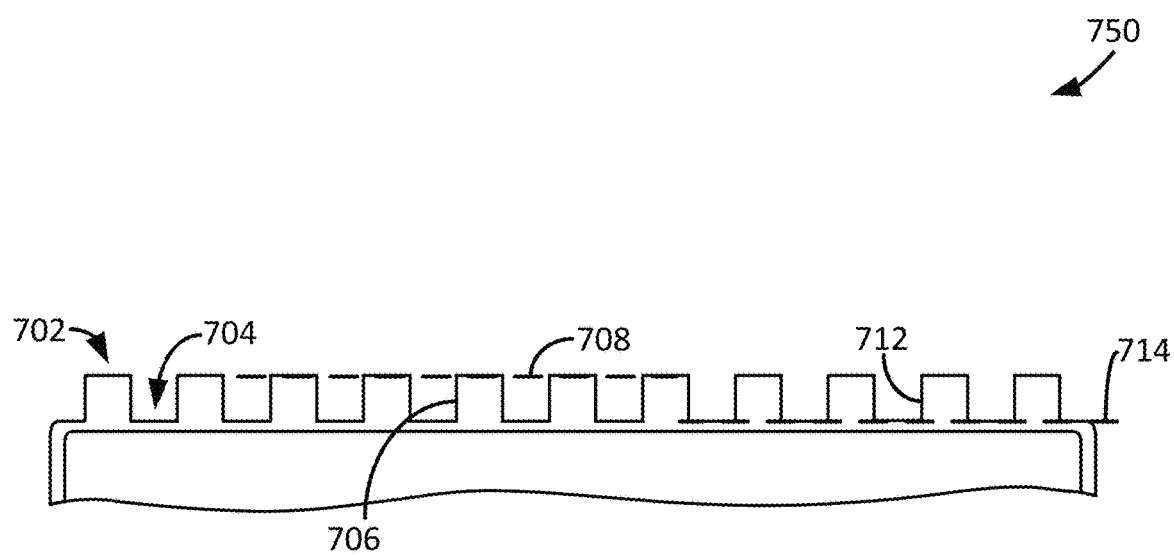
FIG. 7B is a cross-sectional view of a shaped surface that is corrugated with ridges and furrows shaped according to a square wave.

FIG. 7B is a cross-sectional view of a shaped surface 750 that is corrugated with ridges 702 and furrows 704 shaped according to a square wave. The shaped surface 750 shown in FIG. 7B can be formed in accordance with the example patterns shown in FIGS. 4-6. The shaped surface 750 can be formed on any combination of a base inner surface 304, a base outer surface 302, a wall inner surface 308, and a wall outer surface 306. In some embodiments the shaped surface 750 shown in FIG. 7B has at least 3 times greater surface area than a surface area of a flat surface.

The ridges 702 include planar tops that form the tops of the ridges 702. The ridges 702 include ridge sides 706 that extend linearly upwards towards a ridge top plane 708. The ridge top plane 708 is formed along a planar top of a ridge with a corresponding ridge side 706 that extends linearly upwards towards the ridge top plane 708.

The furrows 704 include planar bottom that form the bottoms of the furrows 704. The furrows 704 include furrow sides 712 that extend linearly downwards towards a furrow bottom plane 714. The furrow bottom plane 714 is formed along a planar bottom of a furrow with a corresponding furrow side 712 that extends linearly downward towards the furrow bottom plane 714.

In various embodiments, a rectangular wave pattern is as follows. Assuming the rectangular wave includes component a where a is the peak amplitude (e.g., the height measured from the zero crossings) and b is the width of a rectangular wave (e.g., as measured along the zero crossings):

$$S=4a+2b$$

If a=b=π, S=4π+2π=6π=18.85
Relative to a flat surface with length $$2b=2\pi=6.2832$$

Assuming unit width, the area equals (S)(1) or S.
For example:

| Surface | Area (Assuming Unit Width) | Area Relative to a Flat Surface |
|---|---|---|
| Flat | 6.2832 | 1.000 |
| Sinusoidal in one dimension with amplitude defined above equal to half of the period | 14.482 | 2.305 |
| Rectangular in one dimension with amplitude defined above equal to half of the period | 18.85 | 3.000 |

Figure 8:
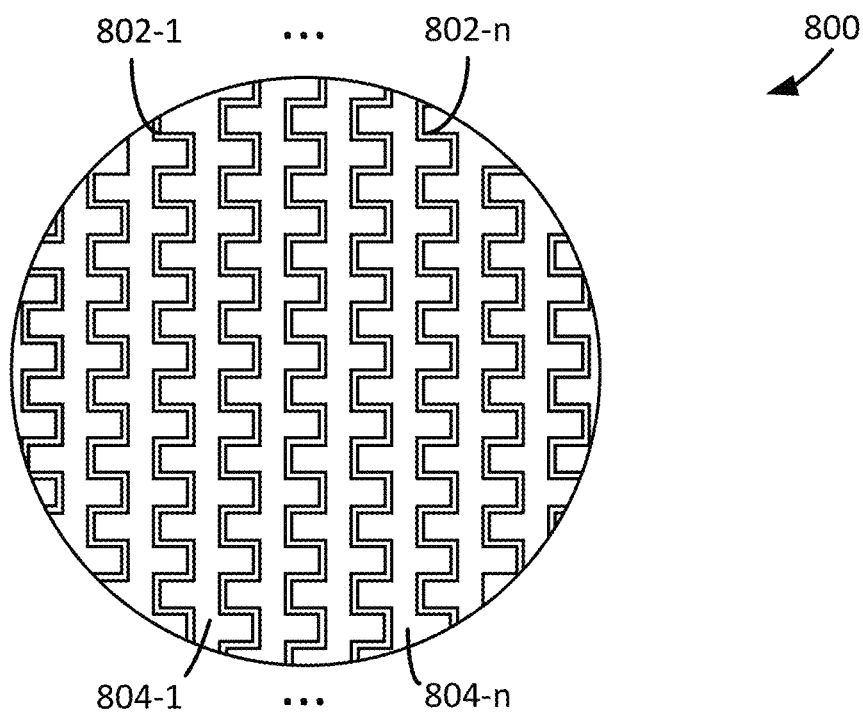
FIG. 8 is a planar view of a shaped surface that is corrugated according to another example pattern.

FIG. 8 is a planar view of a shaped surface 800 that is corrugated according to another example pattern. In various embodiments, an applicable combination of a portion of a base inner surface 304, a base outer surface 302, a wall inner surface 308, and a wall outer surface 306 may be shaped according to the shaped surface 800 shown in FIG. 8.

The shaped surface 800 includes a plurality of ridges 802-1 ... 802-n (hereinafter referred to as "ridges 802") and furrows 804-1 ... 804-n (hereinafter referred to as "furrows 804"). By including ridges 802 and furrows 804, the surface area of the shaped surface 800 is increased relative to the surface area of a flat surface of a same size as the shaped surface 800. In some embodiments, the shaped surface 800 has a surface area that is at least 1.2 times greater than if the shaped surface 800 was flat. In another embodiment, the shaped surface 800 has a surface area that is at least two times greater than if the shaped surface 800 was flat. In another embodiment, the shaped surface 500 has a surface area that can be at least three times or greater than if the shaped surface 500 was flat. The ridges 802 are shaped along the longitudinal length of the ridges 802 according to a planar square wave pattern. Similarly, the furrows 804 are shaped along the longitudinal length of the furrows according to an inverse of a planar square wave pattern of which the ridges 802 adjacent to the furrows 804 are shaped.

Figure 9:
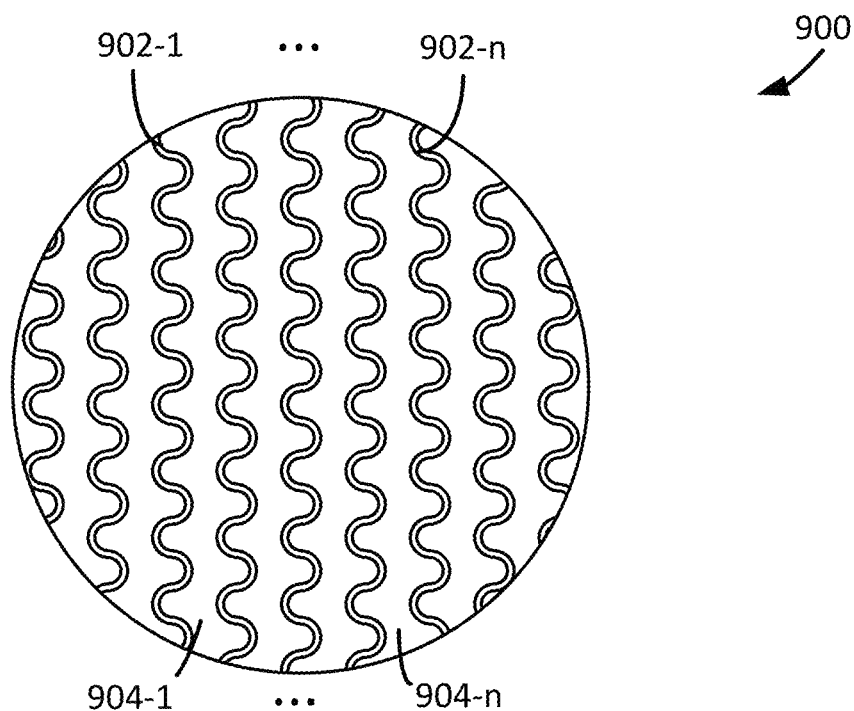
FIG. 9 is a planar view of a shaped surface that is corrugated according to another example pattern.

FIG. 9 is a planar view of a shaped surface 900 that is corrugated according to another example pattern. In various embodiments, an applicable combination of a portion of a base inner surface 304, a base outer surface 302, a wall inner surface 308, and a wall outer surface 306 may be shaped according to the shaped surface 900 shown in FIG. 9.

The shaped surface 900 includes a plurality of ridges 902-1 ... 902-n (hereinafter referred to as "ridges 902") and furrows 904-1 ... 904-n (hereinafter referred to as "furrows 904"). In including ridges 902 and furrows 904, the surface area of the shaped surface 900 is increased over a surface area of a flat surface of a same size as the shaped surface 900. In some embodiments, the shaped surface 900 has a surface area that is at least 1.2 times greater than if the shaped surface 900 was flat. In some embodiments, the shaped surface 900 has a surface area that is at least two times greater than if the shaped surface 900 was flat. In another embodiment, the shaped surface 900 has a surface area that is at least three times greater than if the shaped surface 900 was flat. The ridges 902 are shaped along the longitudinal length of the ridges 902 according to a planar sinusoidal pattern. Similarly, the furrows 904 are shaped along the longitudinal length of the furrows according to an inverse of a planar sinusoidal wave pattern of which the ridges 902 adjacent to the furrows 904 are shaped.

Figure 10:
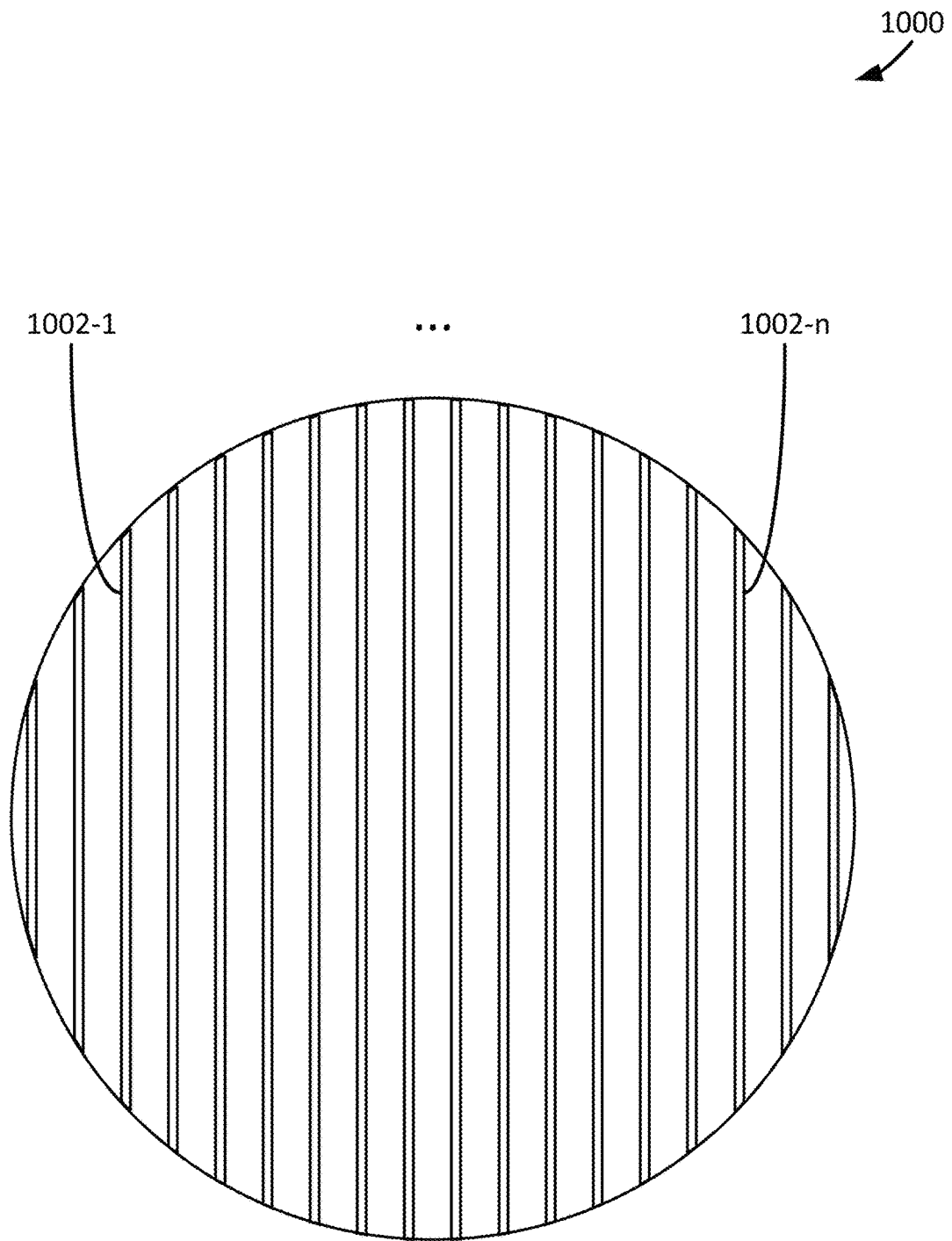
FIG. 10 is a planar view of a shaped surface with a plurality of protrusions according to a protrusion pattern.

FIG. 10 is a planar view of a shaped surface 1000 with a plurality of protrusions according to a protrusion pattern. In various embodiments, protrusions included in the protrusion pattern of the shaped surface shown in FIG. 10 can include any combination of square shaped protrusions, trapezoid shaped protrusions, triangular shaped protrusions, sinusoidal shaped protrusions, and/or protrusions of any shape or pattern.

The protrusion pattern shown in FIG. 10 includes protrusion lines 1002-1 . . . 1002-n (hereinafter referred to as "protrusion lines 1002"), in which protrusions are formed to increase the surface area of the shaped surface 1000. In the shaped surface shown in FIG. 10, the protrusion lines 1002 are parallel to each other.

Figure 11:
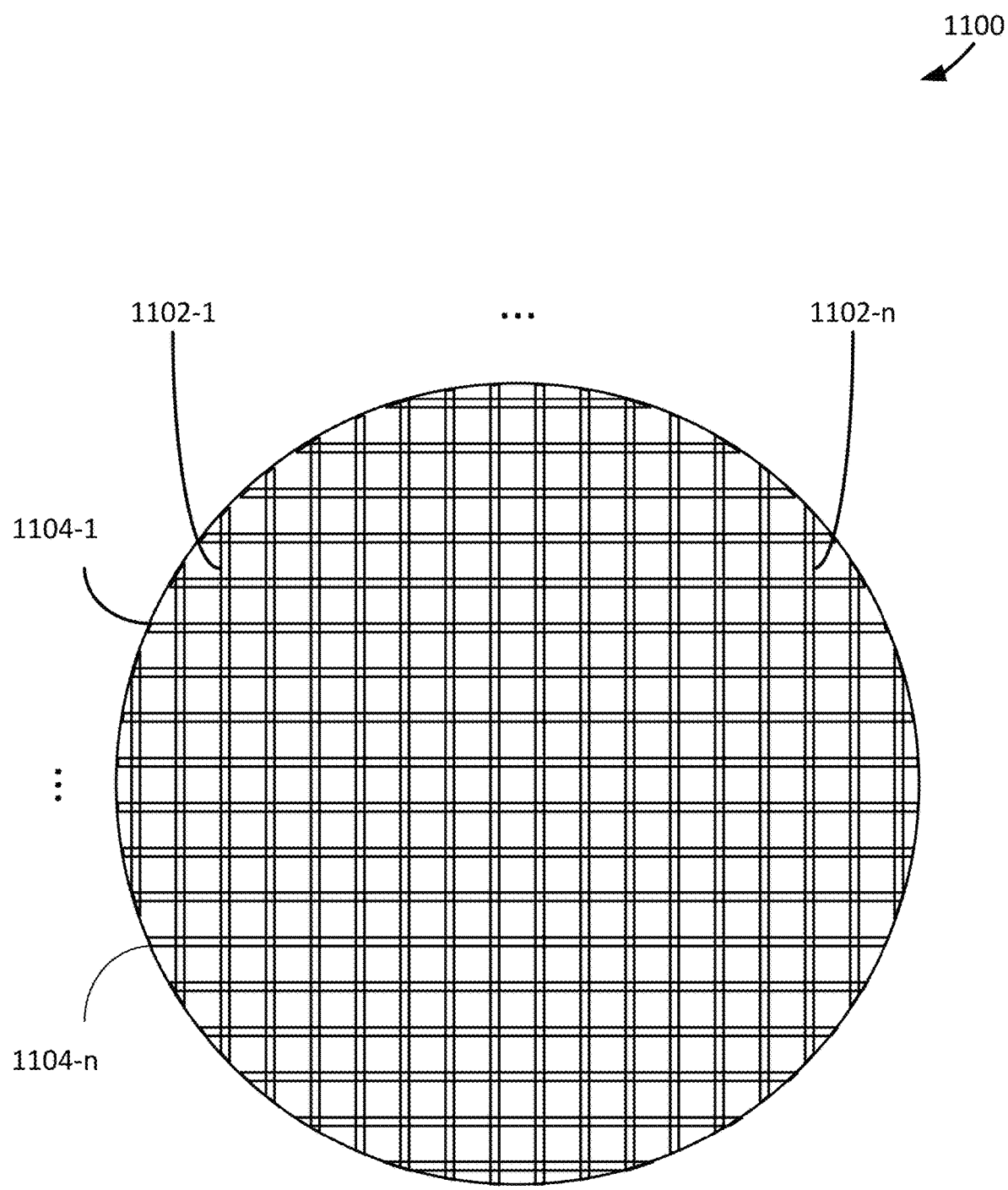
FIG. 11 is a planar view of a shaped surface with a plurality or protrusions according to another protrusion pattern.

FIG. 11 is a planar view of a shaped surface 1100 with a plurality or protrusions according to another protrusion pattern. In various embodiments, protrusions included in the protrusion pattern of the shaped surface shown in FIG. 11 can include any combination of square shaped protrusions, trapezoid shaped protrusions, sinusoidal shaped protrusions, and/or protrusions of any shape or pattern.

The protrusion pattern shown in FIG. 11 includes protrusion columns 1102-1 . . . 1102-n (hereinafter referred to as "protrusion columns 1102") and protrusion rows 1104-1 . . . 1104-n (hereinafter referred to as "protrusion rows 1104"). Protrusions are formed within the protrusion columns 1102 and the protrusion rows 1104 to increase the surface area of the shaped surface 1100. The protrusion columns 1102 and the protrusion rows 1104 intersect to form an array of protrusions on the shaped surface 1100.

Figure 12:
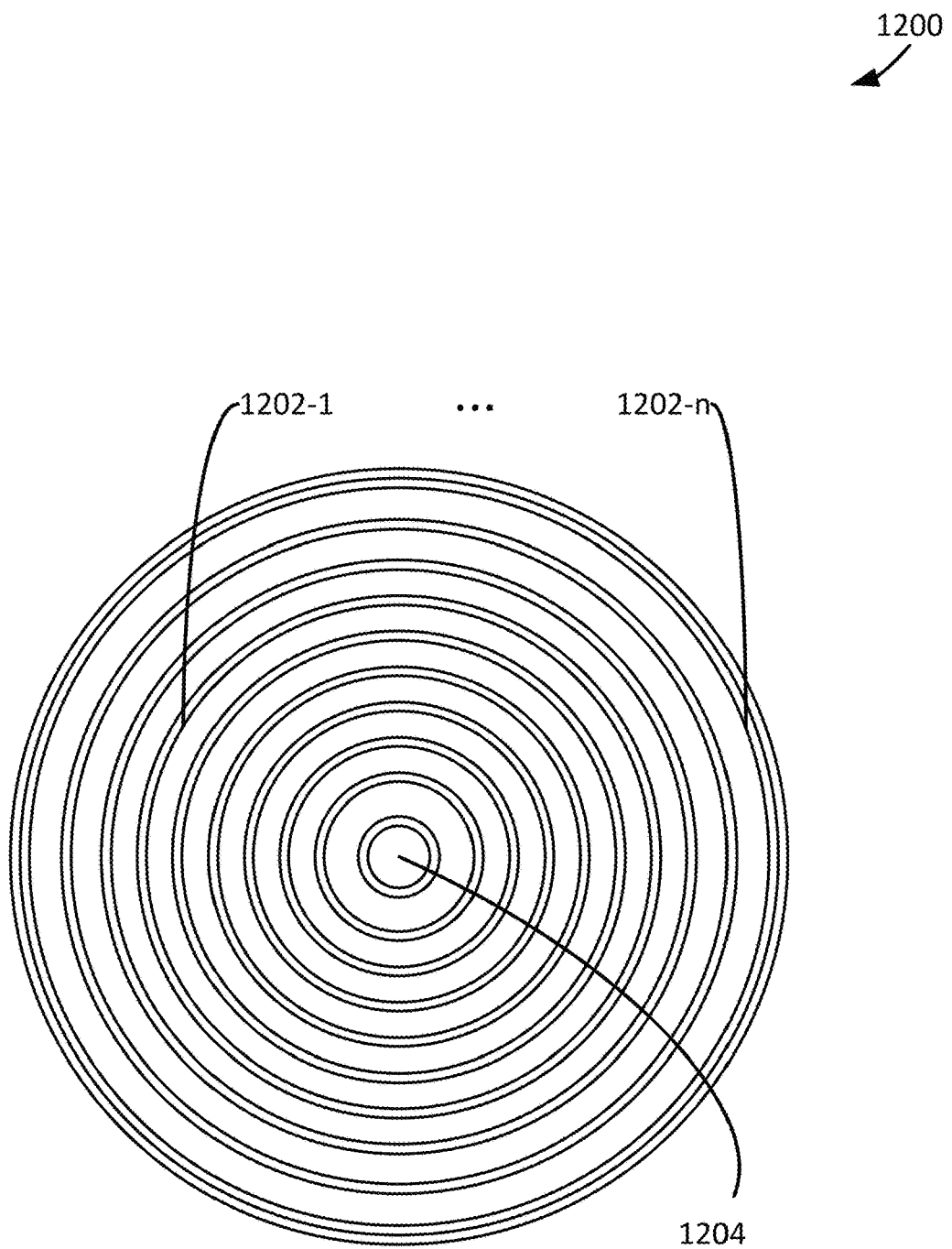
FIG. 12 is a planar view of a shaped surface with a plurality or protrusions according to another protrusion pattern.

FIG. 12 is a planar view of a shaped surface 1200 with a plurality or protrusions according to another protrusion pattern. In various embodiments, protrusions included in the protrusion pattern of the shaped surface shown in FIG. 12 can include any combination of square shaped protrusions, trapezoid shaped protrusions, sinusoidal shaped protrusions, and/or protrusions of any shape or pattern.

The protrusion pattern shown in FIG. 12 includes protrusion rings 1202-1 . . . 1202-n (hereinafter referred to as "protrusion rings 1202") concentrically formed about a pattern center 1204 of the shaped surface 1200. The pattern center 1204 can be a center of the base outer surface 302 or the center of a base inner surface 304 depending on which surface of the base is patterned according to the shaped surface 1200 shown in FIG. 12. Protrusions are formed within the protrusion rings 1202 to increase the surface area of the shaped surface 1200.

In various embodiments, different protrusion patterns (including, for example, the protrusion pattern shown in FIG. 12) may include one or more different pattern centers, any of which may be different than the center of a bottom outer surface 302 and/or the center of a bottom inner surface 304. For example, a bottom outer surface 302 may include any number of pattern centers located next to each other, each pattern center including its own center. Any number of shaped surfaces may be oriented in any manner. As a result, each pattern and/or combination of patterns of a shaped surface may be oriented around any number of pattern centers.

Figure 13:
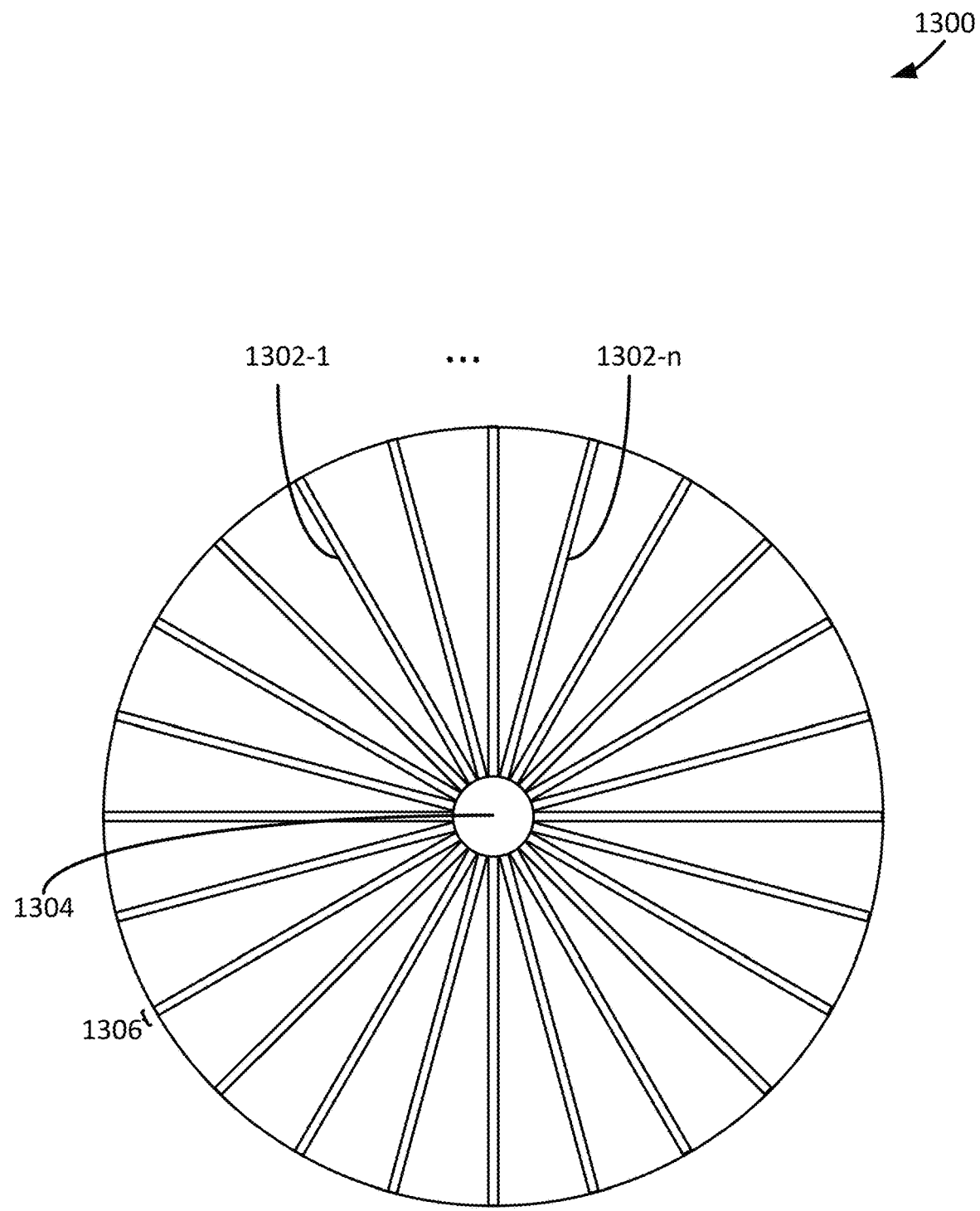
FIG. 13 is a planar view of a shaped surface with a plurality or protrusions according to another protrusion pattern.

FIG. 13 is a planar view of a shaped surface 1300 with a plurality or protrusions according to another protrusion pattern. In various embodiments, protrusions included in the protrusion pattern of the shaped surface shown in FIG. 13 can include any combination of square shaped protrusions, trapezoid shaped protrusions, sinusoidal shaped protrusions, and/or protrusions of any shape or pattern.

The protrusion pattern shown in FIG. 13 includes protrusion radials 1302-1 . . . 1302-n (hereinafter referred to as "protrusion radials 1302") formed to radiate out from a pattern center 1304, center area, or other focal points or areas, of the shaped surface 1300. The pattern center 1304 can be a center of the base outer surface 302 or the center of a base inner surface 304 depending on which surface of the base is patterned according to the shaped surface 1300 shown in FIG. 13. Protrusions are formed within the protrusion radials 1302 to increase the surface area of the shaped surface 1300. The protrusion radials 1302 have protrusion radial widths 1306 that can be constant along the length of the protrusion radials 1302, or they can change along the length of the protrusion radials 1302. For example, protrusion radial widths 1306 of the protrusion radials 1302 can increase along the length of the protrusion radials 1302 as the protrusion radials 1302 extend out from the pattern center 1304.

In various embodiments, different protrusion patterns (including, for example, the protrusion pattern shown in FIG. 13) may include different pattern centers any of which may be different than the center of a bottom outer surface 302 and/or the center of a bottom inner surface 304. For example, a bottom outer surface 302 may include any number of pattern centers located next to each other, each pattern center including its own center.

Figure 14A:
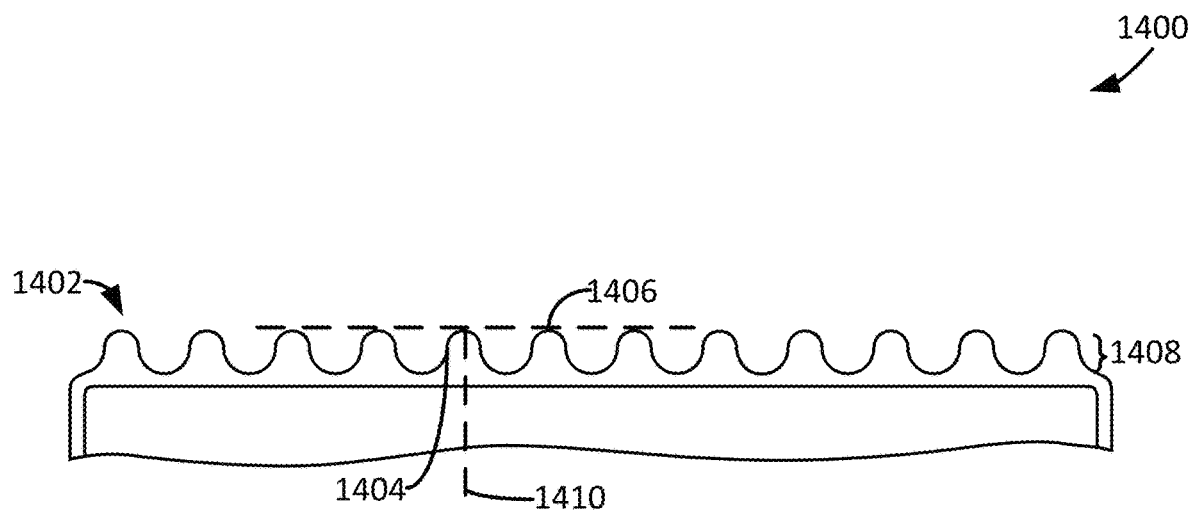
FIG. 14A is a cross-sectional view of a shaped surface with protrusions shaped as a sinusoidal wave.

FIG. 14A is a cross-sectional view of a shaped surface 1400 with protrusions 1402 shaped as a sinusoidal wave. In various embodiments, the protrusions 1402 shown in FIG. 14A can be arranged in the protrusion patterns shown in FIGS. 10-13.

In being shaped as a sinusoidal wave, the protrusions 1402 have protrusion sides 1404 that curve upwards towards a protrusion plane 1406. The protrusion plane 1406 is a plane formed across the tops (e.g., peaks) of the protrusions 1402 at a protrusion height 1408 of the protrusions 1402. In the shaped surface 1400 shown in FIG. 14A, the protrusions 1402 all have the same protrusion height 1408. The protrusion cross-section of the protrusions 1402 exhibit reflection symmetry about a protrusion axis of symmetry 1410 normal to the protrusion plane 1406.

Figure 14B:
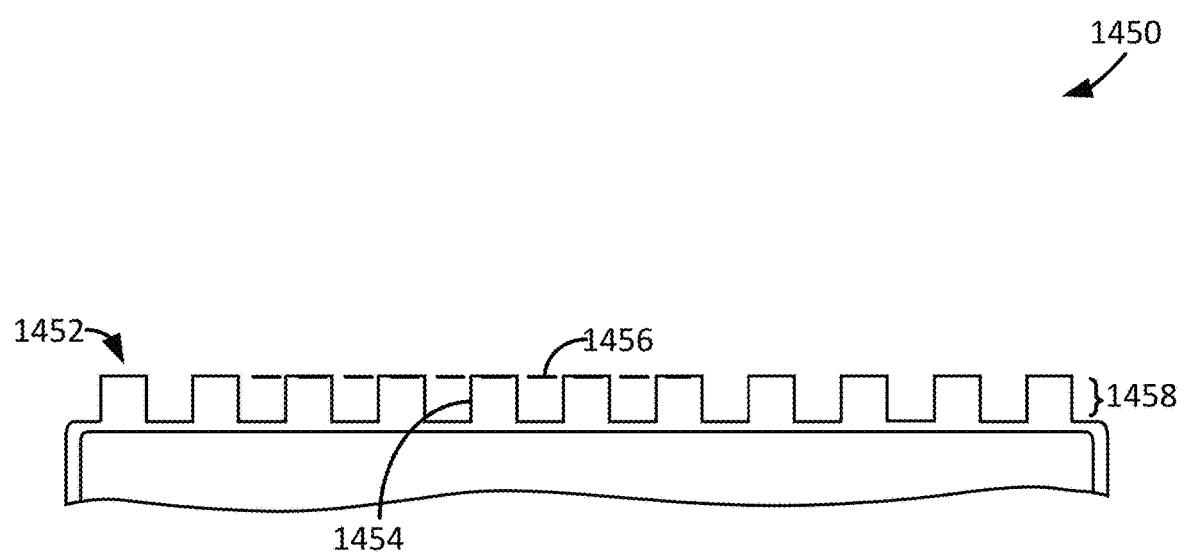
FIG. 14B is a cross-sectional view of a shaped surface with protrusions shaped as a square wave.

FIG. 14B is a cross-sectional view of a shaped surface 1450 with protrusions 1452 shaped as a square wave. In various embodiments, the protrusions 1452 shown in FIG. 14B can be arranged in the protrusion patterns shown in FIGS. 10-13.

In being shaped as a square wave, the protrusions 1452 have protrusion sides 1454 that extend upwards towards a protrusion plane 1456. The protrusion plane 1456 is a plane formed across the top portions (e.g., peaks) of the protrusions 1452 at a protrusion height 1458 of the protrusions 1452. In the shaped surface 1450 shown in FIG. 14B, the protrusions 1452 all have the same protrusion height 1458.

The shaped portions (e.g., protrusions and/or indentations) may comprise any materials including, but not limited to, an alloy, a ceramic, a metal, or any combination of any materials. In some embodiments, shaped portions may include a sandwich structure of various layers of materials.

In various embodiments, any or all of the shaped portions may include the same material as all or a part of the base of a vessel. In some embodiments, any or all of the shaped portions are of a different material as all or a part of the base of a vessel.

FIGS. 15A-G depict a variety of different protrusions and/or indentations that may be on the outer base of a vessel, inside the vessel, or on both the outer base and inside the vessel (e.g., base inner surface 304 and base outer surface 302). In some embodiments, there may be any combination of one or more different shapes (e.g., one or more in any combination of protrusions and/or indentations). For example, a bottom of a vessel may include conical protrusions as well as conical or triangular indentations on the bottom of the vessel.

Figure 15A:
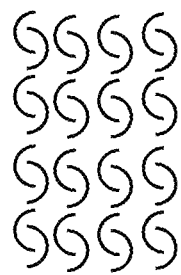
FIG. 15A depicts interlocking elbow shaped surfaces in some embodiments.

FIG. 15A depicts interlocking elbow shaped surfaces in some embodiments. In various embodiments, the interlocking elbow shaped surfaces may project outward forming at least one protrusion from the base of the kettle (i.e., toward the outside of the kettle). In various embodiments, the elbow shaped surfaces may project inward (forming at least one indentation) from the base of the kettle (i.e., toward the inside of the kettle). A kettle may include any combination of projections and indentations. It will be appreciated that any shape, form, size, or any combination of shapes, forms, and sizes may be used for protrusions and/or indentations.

Figure 15B:
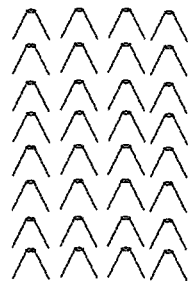
FIG. 15B depicts conical shaped protrusions in some embodiments.
Figure 15C:
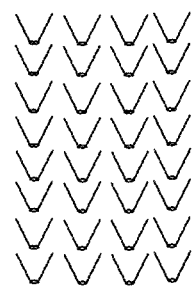
FIG. 15C depicts conical shaped indentations in some embodiments.
Figure 15D:
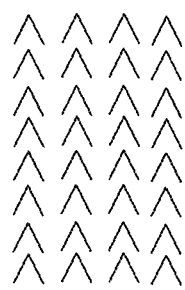
FIG. 15D depicts triangular shaped protrusions in some embodiments.
Figure 15E:
FIG. 15E depicts triangular shaped indentations in some embodiments.
Figure 15F:
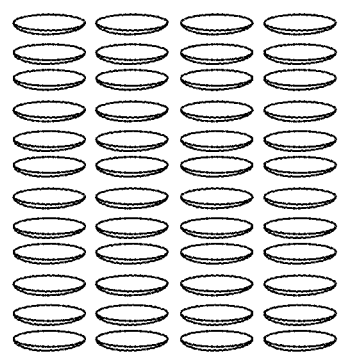
FIG. 15F depicts dimple shaped indentations in some embodiments.
Figure 15G:
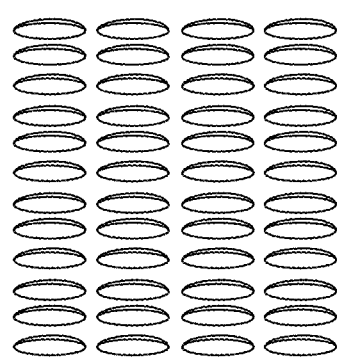
FIG. 15G depicts dimple shaped protrusions in some embodiments.

FIG. 15B depicts conical shaped protrusions in some embodiments. FIG. 15C depicts conical shaped indentations in some embodiments. FIG. 15D depicts triangular shaped protrusions in some embodiments. FIG. 15E depicts triangular shaped indentations in some embodiments. FIG. 15F depicts dimple shaped indentations in some embodiments. FIG. 15G depicts dimple shaped protrusions in some embodiments. In FIG. 15B-G, the protrusions extend toward, and the indentations extend away from, the top of the page on which they are depicted.

Although the shaped protrusions and indentations in FIG. 15B-G appear to be the same shape, size, height, symmetry, or the like, they may be different for any number of the shaped protrusions and/or shaped indentations. Further, there may be any amount of space between the shaped protrusions and/or indentations. Moreover, although the protrusions and/or indentations appear to be right next to each other, the protrusions and/or indentations may be spaced in any way or in any pattern.

In various embodiments, fluid inside the vessel (e.g., the kettle 100 of FIG. 1) may undergo movement caused by convection. Convection may be characterized by movement within the fluid caused at least in part by the tendency of hotter and therefore less dense portions of the fluid (and/or material in the fluid) to rise while colder, denser portions of the fluid (and/or material in the fluid) move downward. Convection may be caused by non-uniform heating. Convection in a plane horizontal to a layer of fluid heated from one side (e.g., below) may be termed Rayleigh-Bénard convection.

In the prior art, kettles and other cooking vessels celebrate the feature of uniform heating. While uniform heating may keep a solid in a pan (e.g., a steak) from cooking unevenly, convection in a fluid may enhance heat transfer to a fluid contained in the vessel, thereby allowing fluids (e.g., water, liquid, substance, or liquid/solid mixtures) to heat more quickly. Further, the fluid motion due to convection may facilitate mixing of the fluid.

Convection may be caused (e.g., induced) in any number of ways. In some embodiments, there may be variations in the thickness of the base or walls of the vessel which may cause convection. For example, with regard to FIG. 3, one section of a base portion may be thicker than another section of the base portion. Similarly, one section of a wall portion may be thicker than another section of the wall portion. In one example, a vessel may have a thicker base at the periphery and a thinner base at the center. In another example, the base portion may include a plurality of portions (e.g., a pattern) that are thicker than other portions of the base (e.g., a pattern of thicker portions in all or a section of the base portion). Similarly and/or in addition, the wall portion may include a plurality of portions (e.g., a pattern) that are thicker than other portions of the wall (e.g., a pattern of thicker portions in all or a section of the wall portion). The variations in thickness may create uneven heating such that may cause convection.

In various embodiments, the base portion may be thicker in some areas and thinner in others. For example, a vessel may have a thicker base at the periphery and a thinner base at the center (e.g., an inverted cone on the base outer surface 302 or the base inner surface 304). It will be appreciated that, in some embodiments, the base portion may be thinner in some areas and thicker in others (e.g., a cone shape). Base portions in these configurations may contribute to convection.

In some embodiments, the thickness of the base portion may be consistent, but convection may be caused by including different materials within the base 102 and/or walls 104 of the vessel 106. As discussed herein, the vessel 106 may, for example, include a core of one metal (e.g., aluminum) clad in stainless steel or other non-reactive metal(s) or alloy(s), and the base of the vessel may have sections of a core that are thicker than other portions (e.g., some portions of the core may be thicker aluminum or copper than other portions of the core). The variations in thickness of the core and variations in the amount of material with different thermal properties (discussed further herein) may create uneven heating such that convection may be induced.

There may be any number of different materials in the base and/or walls of the vessel that may cause convection. For example, different materials may be utilized that have different thermal properties. The different material can be included in some portions (i.e., not all) of the base (e.g., the base may include stripes, squares, chunks, bits or other portions of different materials with different thermal properties than the material which is included in the rest of the base) so as to induce convection. It will be appreciated that highly heat conductive materials may be included (e.g., copper or aluminum) and/or heat insulating materials can be included in the base or walls of the vessel.

For example, the sides and/or base of a vessel may include materials of different thermal characteristics (e.g., with different thermal diffusivities). In some embodiments, the sides and/or base of the vessel may include either exposed (e.g., on the base inner surface 304 of the vessel) or clad (e.g., within a core) strips of material that are different (e.g., the strips may be of aluminum and the rest of the base may be stainless steel). There may be any pattern of strips or materials of any shapes within (or on) the base inner surface 304, base outer surface 302, wall inner surface 308, and/or wall outer surface 306 of the vessel. In another example, any or all of the shaped surfaces (see FIGS. 4, 10, and 11) may comprise different materials than all or parts of the base and/or walls of the vessel.

It will be appreciated that a vessel may include variations in thickness and/or different materials.

Differences in surface area at the base 102 and/or walls 104 of a vessel 106 between a thermal energy source and fluid (e.g., the base outer surface 302 of a vessel or a base inner surface 304 of the vessel 106) may cause convection of fluid within the vessel 106. As discussed herein the shaped portion of the wall outer surface 306 and/or the shaped portion of the wall inner surface 308 may include, for example, raised sinusoidal ridges, raised rectangular ridges, indented sinusoidal furrows, indented rectangular ridges, posts, raised portions, depressed portions, protrusions, indentations, or the like of any size or shape. The shaped portion may include raised portions of a surface, depressions in the surface, or a combination of raised portions and depressed portions (e.g., a combination of protrusions and indentations) of the surface. Examples include, but are not limited to, shaped portions with (e.g., substantially) increased surface area (in comparison with a flat surface). In various embodiments, only a portion or the entire wall outer surface 306 and/or at least a portion of the wall inner surface 308 includes a shaped portion.

As previously discussed, differences in surface area across the base 102 or walls 104 of a vessel 106 between a thermal energy source and fluid (e.g., the base outer surface 302 of a vessel 106 or a base inner surface 304 of the vessel 106) may cause (e.g., induce) convection of fluid within the vessel 106. For example, differences in surface area of ridges and/or furrows (e.g., changes in surface area of the protrusions and/or indentations) of the base outer surface 302 of a vessel 106 may cause heat transfer to be non-uniform, thereby causing convection (e.g., motion) of the fluid inside the vessel 106 as well as increases in heat transfer.

In various embodiments, differences in surface area of all or some of the base or walls of the vessel 106 may increase, by convection, the rate at which thermal energy is transferred to a substance (e.g., fluid) contained within the vessel 106. The increased rate of thermal energy transfer may be substantially increased when compared to vessels in the prior art (e.g., with less surface area and/or uniform construction which do not induce convection). Further, the convection induced by the differences in surface area may further cause mixing of the substance within the vessel 106.

Figure 16A:
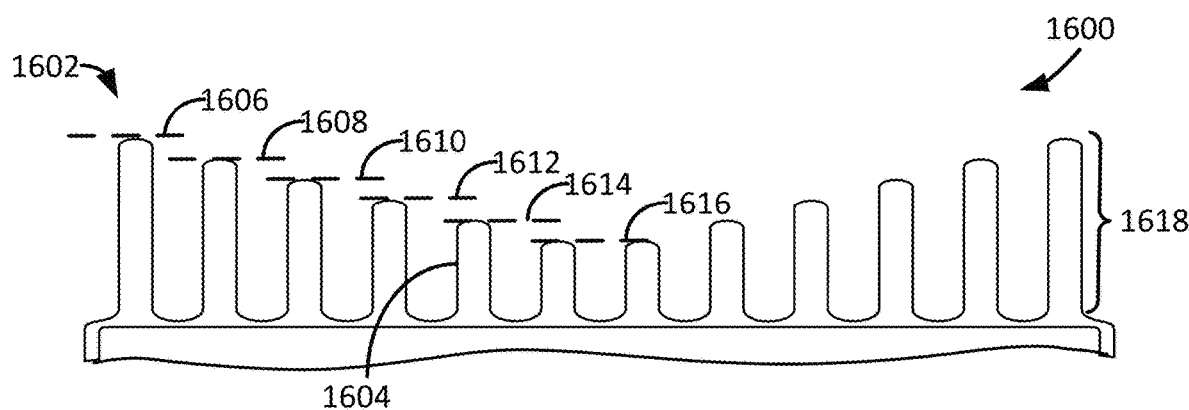
FIG. 16A is a cross-sectional view of a shaped surface with rounded protrusions.

FIG. 16A is a cross-sectional view of a shaped surface 1600 with rounded protrusions 1602. In various embodiments, the protrusions 1602 shown in FIG. 16A can be arranged in the protrusion patterns shown in FIGS. 10-13.

The rounded protrusions 1602 may be shaped as waves. The protrusions 1602 may have different amplitudes (e.g., heights) as depicted in FIG. 16A or may have heights in any pattern. In some embodiments, the protrusions 1602 have protrusion sides 1604 that are directed upwards towards protrusion planes 1606-1616. The protrusion planes 1606-1616 are planes that are formed across the tops (e.g., peaks) of the protrusions 1602.

In the shaped surface 1600 shown in FIG. 16A, the protrusions 1602 have a pattern of protrusion heights that are higher at the periphery and shorter at the center. It will be appreciated that the protrusion heights may be random or may be of any pattern. For example, protrusion heights may be shorter at the periphery and higher at the center. In another example, each protrusion may be higher or shorter than an adjacent protrusion (e.g., taller protrusions may be next to shorter protrusions).

It will also be appreciated that there may be any number of patterned shapes on each vessel (e.g., on the outer surface 302 or the base inner surface 304). For example, there may be any number of circular patterns of protrusions on the base of a vessel. For example, each circular pattern may include protrusions like those depicted in FIG. 16A (e.g., shorter at the center and higher at the periphery of each circular pattern). As similarly discussed, the circular pattern of protrusions may be higher in the center and lower at the periphery of each circular pattern. A circular pattern may be asymmetric. In some embodiments, circular patterns across the base of a vessel may have different protrusions, different patterns, different size, and/or different shape. Similarly, there may be a combination of circular, rectangular, and/or square patterns (or patterns of any shape) on the base outer surface 302 or the base inner surface 304.

Figure 16B:
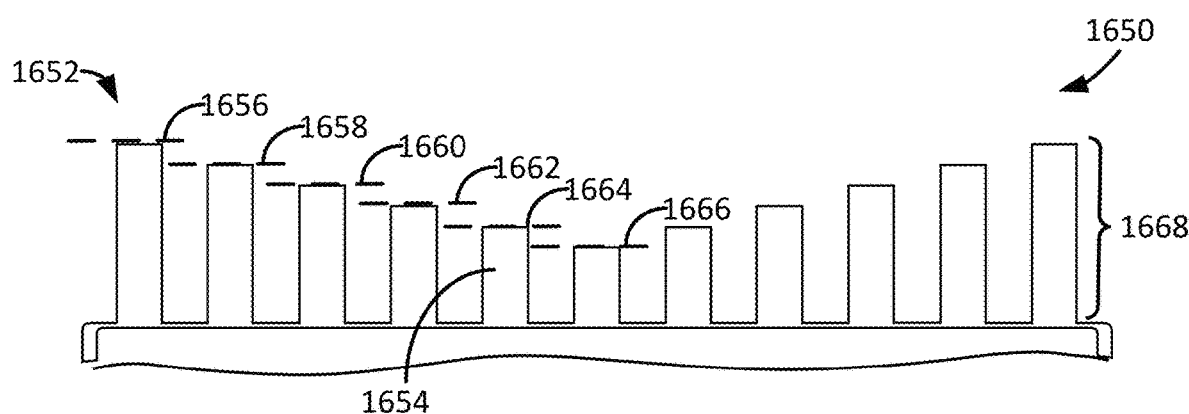
FIG. 16B is a cross-sectional view of a shaped surface with protrusions shaped as a square wave.

FIG. 16B is a cross-sectional view of a shaped surface 1650 with protrusions 1652 shaped as a square wave. In various embodiments, the protrusions 1652 shown in FIG. 16B can be arranged in the protrusion patterns shown in FIGS. 10-13.

In being shaped as a square wave, the protrusions 1652 have protrusion sides 1654 that extend upwards towards one of protrusion planes 1656, 1658, 1660, 1662, 1664, and 1666. The protrusion planes 1656-1666 are planes that are formed across the top portions (e.g., peaks) of the protrusions 1652.

As similarly discussed regarding the shaped surface 1600 shown in FIG. 16A, the protrusions 1652 have a pattern of protrusion heights that are higher at the periphery and shorter at the center. It will be appreciated that the protrusion heights may be random or may be of any pattern. For example, protrusion heights may be shorter at the periphery and higher at the center. In another example, each protrusion may be higher or shorter than an adjacent protrusion (e.g., taller protrusions may be next to shorter protrusions).

It will be appreciated that the variety of different protrusions and/or indentations depicted in FIGS. 15A-G may have sections of protrusions and/or indentations with different surface area than other sections of protrusions and/or indentations. Differences in surface area and/or materials (e.g., with different thermal diffusion properties) may promote non-uniform heating and induce convection. The variety of different protrusions and/or indentations depicted in FIGS. 15A-G may be on the outer base of a vessel, on the inner base of a vessel, on the inner wall of a vessel, and/or on the outer wall of a vessel. In various embodiments, the variety of different protrusions and/or indentations depicted in FIGS. 15A-G may be on the base inner surface 304 and the base outer surface 302). In some embodiments, there may be any combination of one or more different shapes (e.g., one or more in any combination of protrusions and/or indentations). For example, a bottom of a vessel may include conical protrusions as well as conical or triangular indentations in the bottom of the vessel.

It will also be appreciated that there may be multiple patterned shapes on the inside and/or the outside of the vessel. For example, there may be any number of square or circular patterns of protrusions on the base outer surface 302 or the base inner surface 304. For example, each circular pattern may include protrusions like those depicted in FIG. 16B (e.g., shorter at the center and higher at the periphery of each circular pattern). As similarly discussed, the circular pattern of protrusions may be higher in the center and lower at the periphery of each circular pattern. A circular pattern may be asymmetric. In some embodiments, circular patterns across the base of a vessel may have different protrusions, different patterns, and/or be of any size and/or shape. Similarly, there may be a combination of circular, rectangular, and/or square patterns (or patterns, sizes, or any shape) on the base of the outer surface 302 or the base inner surface 304.

In various embodiments, the shaped portion of the base outer surface 302, base inner surface 304, wall outer surface 306, and/or wall inner surface 308 is shaped to have 1.2 or more times (e.g., 1.5 times or more, 2 times or more, 3 times or more, or the like) the surface area than its corresponding flat surface. Further, sections of the base portion(s) may have different surface area(s) than other sections of the base portion(s), thereby further inducing convection.

In various embodiments, the shaped portions may comprise different materials that induce and/or further contribute to non-uniform heating and convection. The shaped portions (e.g., protrusions and/or indentations) may comprise any material or the like including, but not limited to an alloy, a ceramic, a metal, or any combination of any materials. In some embodiments, shaped portions may include a sandwich structure of various layers of materials. In various embodiments, any or all of the shaped portions are of the same material as all or a part of the base of a vessel. In some embodiments, any or all of the shaped portions are of a different material as all or a part of the base of a vessel.

In various embodiments, the vessel may include a mechanical mixer which may mix fluids in the vessel and force convection. For example, there may be one or more mixers (e.g., a blade or a propeller driven by a motor with a power source such as a battery) attached to the base, top, receiving aperture, or walls inside the vessel.

Figure 17:
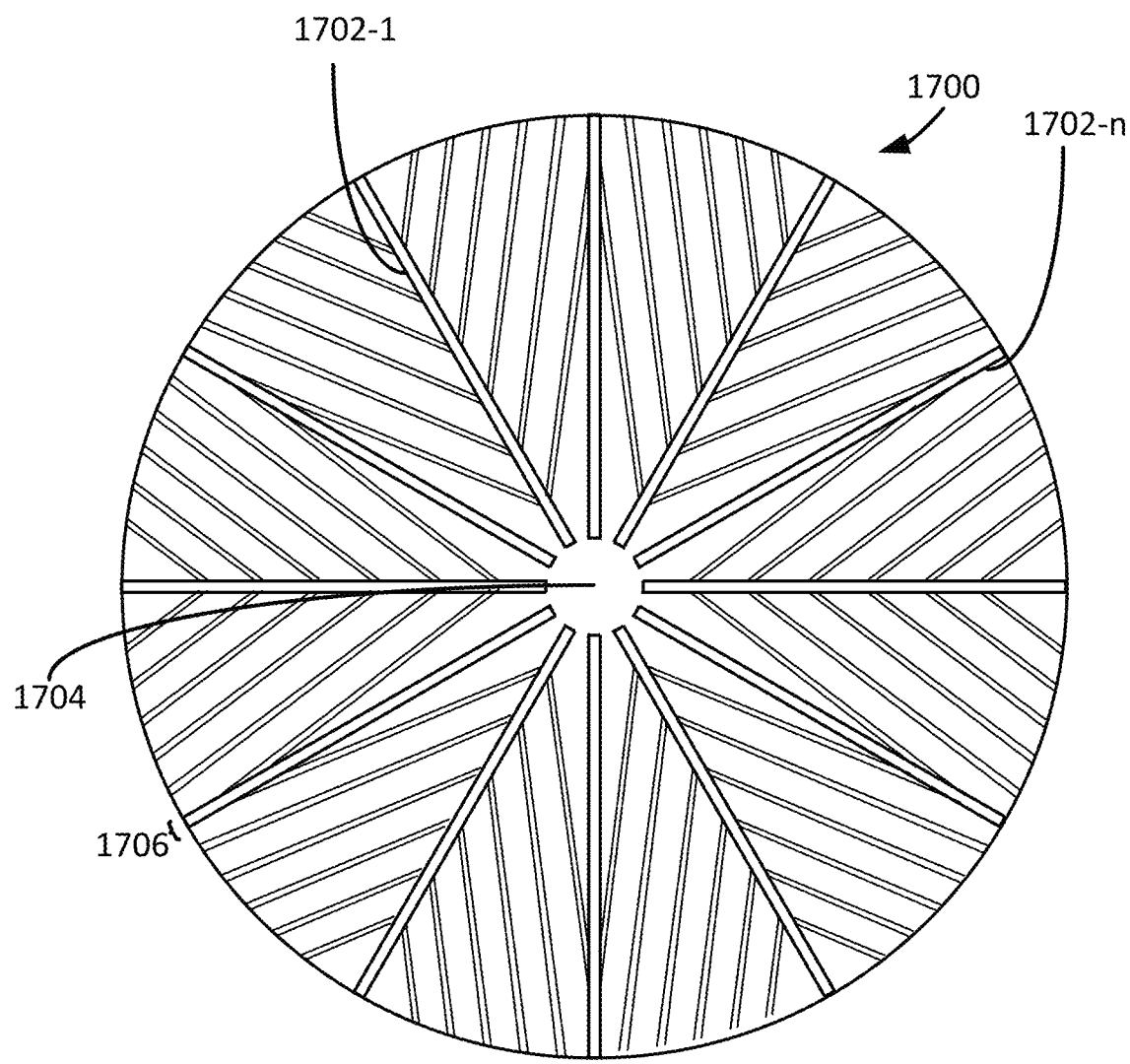
FIG. 17 is a planar view of a shaped surface with a plurality or protrusions according to another protrusion pattern.

FIG. 17 is a planar view of a shaped surface 1700 with a plurality of protrusions according to another protrusion pattern. The protrusions included in the protrusion pattern of the shaped surface shown in FIG. 17 may include different protrusions with different surface areas. Further, the protrusions may comprise different material(s) from each other and/or the base of the vessel.

In various embodiments, protrusions included in the protrusion pattern of the shaped surface shown in FIG. 17 can include any combination of square shaped protrusions, trapezoid shaped protrusions, and sinusoidal shaped protrusions. Each square shaped protrusion, trapezoid shape protrusion, and sinusoidal shaped protrusion included in the shaped surface shown in FIG. 17 can be formed around a central protrusion axis for each protrusion.

The protrusion pattern shown in FIG. 17 includes protrusion radials 1702-1 . . . 1702-n (hereinafter referred to as "protrusion radials 1702") formed to radiate out from a pattern center 1704 along central spines to create a star pattern of the shaped surface 1700. The pattern center 1704 can be a center of the base outer surface, or the center of a base inner surface, depending on which surface of the base is patterned according to the shaped surface 1700 shown in FIG. 1700. Protrusions are formed within the protrusion radials 1702 to increase the surface area and/or provide differences in surface area of the shaped surface 1700. The protrusion radials 1702 have protrusion radial widths 1706 that can be constant across the length of the protrusion radials 1702 or can change along the length of the protrusion radials 1702. For example, protrusion radial widths 1706 of the protrusion radials 1702 can increase along the length of the protrusion radials 1702 as the protrusion radials 1702 extend out from the pattern center 1704.

It will be appreciated that the bottom outer surface 302 of the kettle and/or an inside surface (e.g., bottom inner surface 304) may include any shape of ridges, furrows, protrusions, indentations, and/or the like in any pattern that increases (e.g., substantially) surface area. If there is a substantial increase in surface area between the outside bottom surface of the kettle and a thermal source, the kettle may absorb heat at a substantially higher rate. If there is a substantial increase in surface area between the inside bottom surface of the kettle and a liquid in the kettle, then the kettle may transfer heat from the kettle to an enclosed substance or liquid at a substantially higher rate.

Changes in surface area may also induce convection. As a result, the transfer of, or the rate of transfer of, heat from the vessel to an enclosed substance or liquid may occur at a substantially higher rate. Further, the induced convection may mix the substance or liquid, and may lead to more rapid heating of a substance or liquid contained in the vessel.

As a fluid within the vessel heats, convection currents can form, and temperature-dependent physical properties (e.g., density, surface tension, and kinematic viscosity) can induce convection currents having characteristic patterns (e.g., 2-dimensional rolls or hexagonal cells). These convection currents induce mixing, and lead to more rapid heating of a fluid contained in the vessel.

It will be appreciated that a horizontal layer of convecting fluid may exhibit self-organizing (e.g. pattern-forming) properties. For example, depending on the fluid and non-uniform heating, toroidal vortices may result (e.g., because of the instability of differentially rotating fluid and convection rolls).

In various embodiments, convection of fluid within the vessel may generate convective flow structures within the fluid. A flow structure may depend, for example, upon surface tension of the fluid, nature of heat transfer, variations in non-uniform heating, protrusions and/or indentations or indentations on the base and or walls of the vessel, and shape of the vessel. In one example, flow patterns may include polygonal (e.g., hexagonal) cells with upflow at the center of each cell and downflow at the periphery. The pattern, for example, may resemble a honeycomb pattern of individual cells. In some embodiments, convection can lead to a variety of flow patterns, all of which lead to higher overall heat transfer, or a higher rate of heat transfer, to the fluid as a result of fluid motion and possible mixing.

It will be appreciated that convection patterns of quasi-two-dimensional rolls or three-dimensional cells may appear in the fluid. The structure of thermogravitational (buoyancy-driven) convection may differ from thermocapillary (surface tension-driven) convection.

Figure 18A:
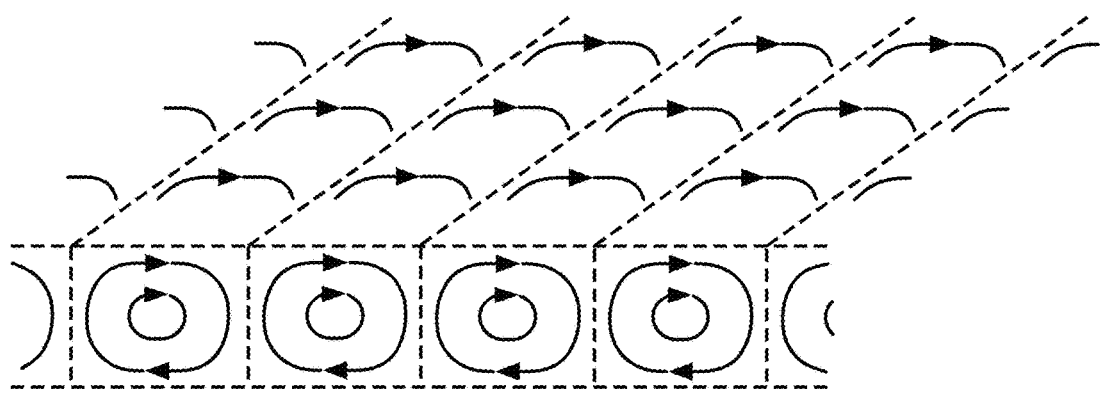
FIG. 18A is a planform schematic diagram of two-dimensional rolls of convection cells.

The configuration of a cell in projection onto a plane (e.g., x and y coordinate plane) is called the cell planform. FIG. 18A is a planform schematic diagram of two-dimensional rolls of convection cells. Since the wavevector is oriented in the x-direction, such rolls (parallel to the y-axis) may be identified as "x-rolls." In the vicinity of the interface between two such rolls, the fluid may circulate in the x,y plane in opposite directions.

Figure 18B:
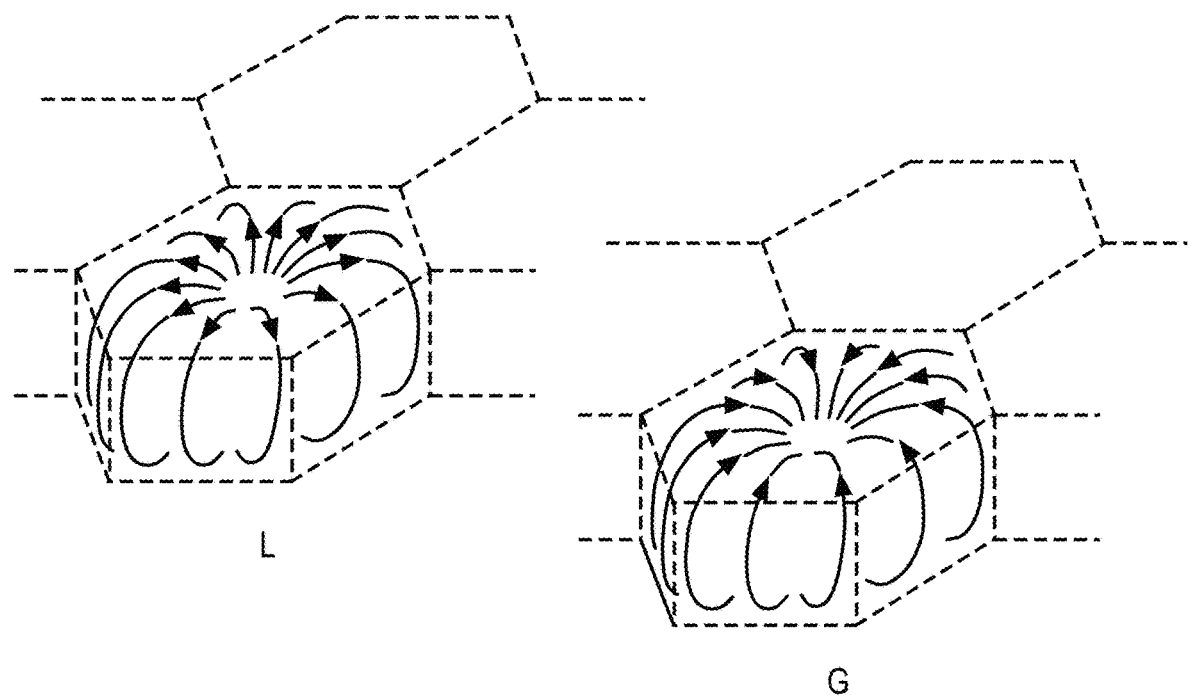
FIG. 18B is a planform schematic diagram of hexagonal L- and G-cells.

FIG. 18B is a planform schematic diagram of hexagonal L- and G-cells. This system may be a superposition of three roll sets with wavevectors having the same modulus and directed at an angel of $2\pi/3$ to each other. A hexagonal cell may be identified as an L- or G-cell depending on the sign of the velocity (e.g., on whether the fluid ascends or descends in the central part of the cell). It will be appreciated that very small alterations in the physical conditions, or small variations in the physical properties of the fluid, can result in radical changes in the structure of convection patterns.

Although G-cell formations may be more common in observed gases and L-cells may be more common in observed liquids, all or portions of the fluid in the vessel 106 may include one or more L-cells and/or G-cells. Direction and circulation may depend upon the derivatives of viscosity or density with temperature. It will be appreciated that ascending fluid in a convection cell may be warmer than the descending fluid. As a result, the central part of the L-cell may be less viscous or less dense for liquids and the peripheral part of a G-cell may be less viscous or less dense for gases.

There may be transitions of patterns in a fluid of the vessel 106. For example, all or a portion of the fluid may start in a motionless state and transition to a pattern of hexagonal cells. All or part of the fluid may transition from a pattern of hexagonal cells to a pattern of rolls. Any or all transitions may be related to the density and/or the viscosity of all or a portion of the liquid and/or temperature (e.g., depending on heat transfer).

Figure 19:
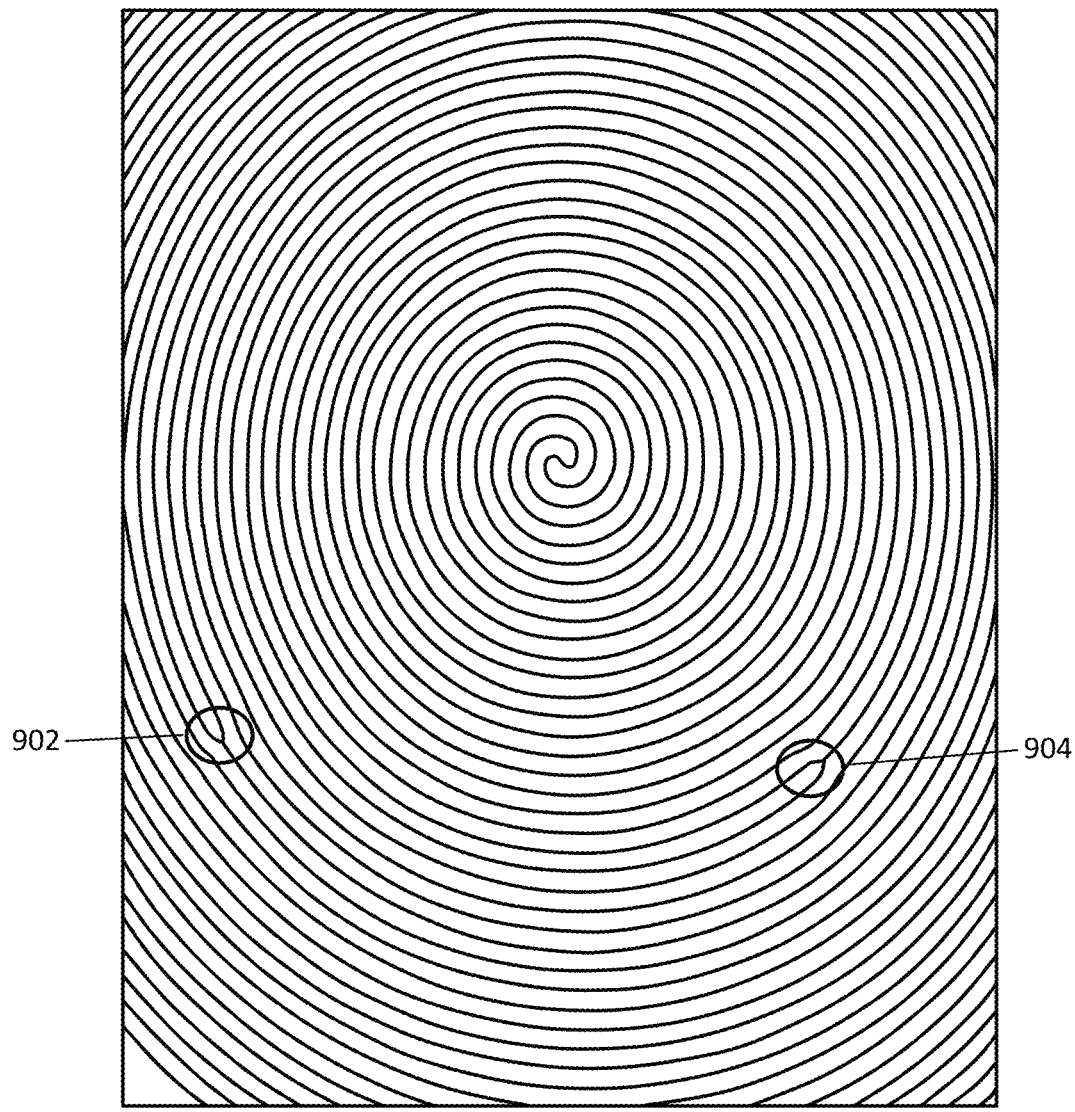
FIG. 19 is a two-armed spiral in a fluid that rotates clockwise in some embodiments.

FIG. 19 is a two-armed spiral in a fluid that rotates clockwise in some embodiments. It will be appreciated that variation(s) of one or more characteristics of the fluid with temperature may play a role in fluid rotation or convection, such as the variation of density and/or viscosity with temperature. Dependencies may be based on kinematic viscosity, thermal conductivity, and/or heat at constant pressure. Transitions (e.g., to the two-armed spiral or the like) may begin closer to the walls of the vessel and subsequently involve regions closer to the center. For example, a roll pattern may be ordered into a left- or right-handed spiral with the number of arms varying from run to run. The outer part of such a pattern may comprise concentric circular rolls. Each arm of the spiral may terminate in a pattern defect called a dislocation and, as a result, the spiral may be mismatched with outer rings (see dislocations 1902 and 1904 in FIG. 9). The direction of spiral rotation may be the result of waves propagating from the spiral core (e.g., from the center of the vessel 106). The formation of a "global" spiral pattern fitting into container geometry may be an effect of a small horizontal temperature gradient near the wall of the vessel (e.g., producing sidewall forcing).

It will be appreciated that if the fluid layer has an appreciable asymmetry of the physical condition with respect to the midplane (e.g., $z=\frac{1}{2}$ or an up-down asymmetry), then three-dimensional cells may form. If, however, the layer is symmetric, then two-dimensional rolls may arise. A transition from some roll set to a mirror reflection about the midplane may be equivalent to a uniform translation of the entire pattern in the direction of a vector. Three-dimensional cells may not share this property. It is therefore not surprising that rolls may be typical for the case where the top and bottom part of a layer are indistinguishable. Alternately, the existence of hexagonal L- and G-cells is compatible with the presence of non-uniformity of viscosity (e.g., the direction of circulating may be such that the viscosity is minimum in the region of the highest strain rates which may be in the central part of a cell).

It will be appreciated that there may be no convection pattern, that convection patterns appear or disappear over time, and/or convection patterns change based on changes in heat transfer, variations or fluctuations in localized temperatures, and fluid characteristics.

Figure 20A:
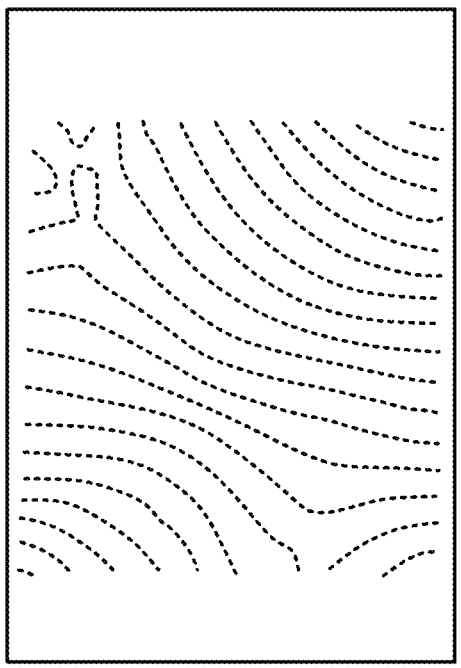
FIG. 20A depicts texture in a rectangular container (the neighborhoods of the short container walls are not visible.
Figure 20B:
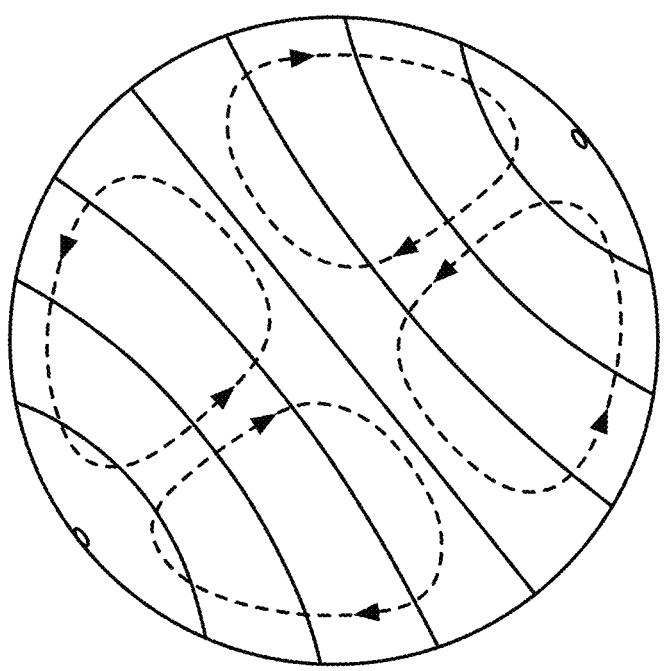
FIG. 20B depicts a schematic image of a texture in a circular container (dashed lines indicate the main features of the structure of the large scale flow).

FIG. 20A and FIG. 20B are roll patterns with boundaries of the rolls depicted by dotted and solid lines. FIG. 20A depicts texture in a rectangular container (the neighborhoods of the short container walls are not visible). FIG. 20B depicts a schematic image of a texture in a circular container (dashed lines indicate the main features of the structure of the large scale flow). As depicted in FIGS. 20A and B, there may be a tendency of rolls to approach the sidewalls at a right angle.

In various embodiments, if there are no complicating factors, roll flows may represent a basic form of steady-state convection. It will be appreciated that rolls are typically not quite straight and the roll flow may not be strictly two-dimensional. This may be due, at least in part, because the flow involves only a portion of a layer and the presence of sidewalls may considerably affect the flow of the fluid and its structure.

It will be appreciated that flows within a fluid may be affected by: 1) situations where the sidewall thermal regime dictates a certain character of flows in the region near the wall; and/or 2) non-uniformities (however insignificant) of heating from below and/or cooling from above.

Figure 21A:
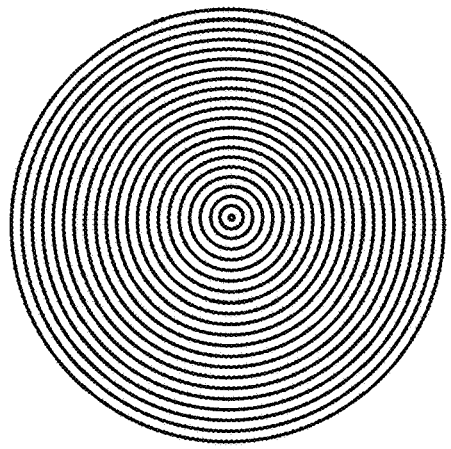
FIG. 21A depicts concentric rolls formed with stronger forcing.
Figure 21B:
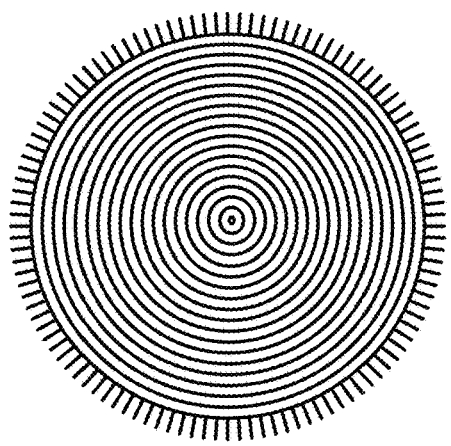
FIG. 21B depicts concentric rolls formed with weaker forcing and superposed by short crossed rolls near the wall.
Figure 21C:
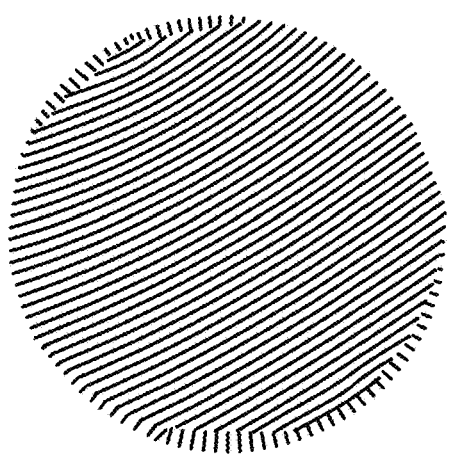
FIG. 21C depicts straight rolls formed from a disordered pattern.

FIG. 21A-C depict roll patterns in a circular container. FIG. 21A depicts concentric rolls formed with stronger forcing. In some embodiments, the wall that exerts stronger forcing may create an axisymmetric system of rolls (see FIG. 21A). The effect of the less forcing wall may also be sufficient for axisymmetric convection but may not be strong enough for circular rolls next to the wall to be stable. Cross-roll instability may occur, resulting in development of a secondary flow in the form of short roll segments directed along container radii and abutting against the wall. These cross rolls may occupy an annular region of width as seen in FIG. 21B. FIG. 21B depicts concentric rolls formed with weaker forcing and superposed by short crossed rolls near the wall.

FIG. 21C depicts straight rolls formed from a disordered pattern. In some embodiments, it may be possible to obtain a set of almost straight rolls even if the wall with stronger forcing is used. If fluid pattern motions are sufficiently vigorous (developing initially little ordered flow), formed rolls that are weakly curved may appear; and in those near-wall regions, the rolls may make small angles with the wall thereby creating short cross rolls.

Figure 22:
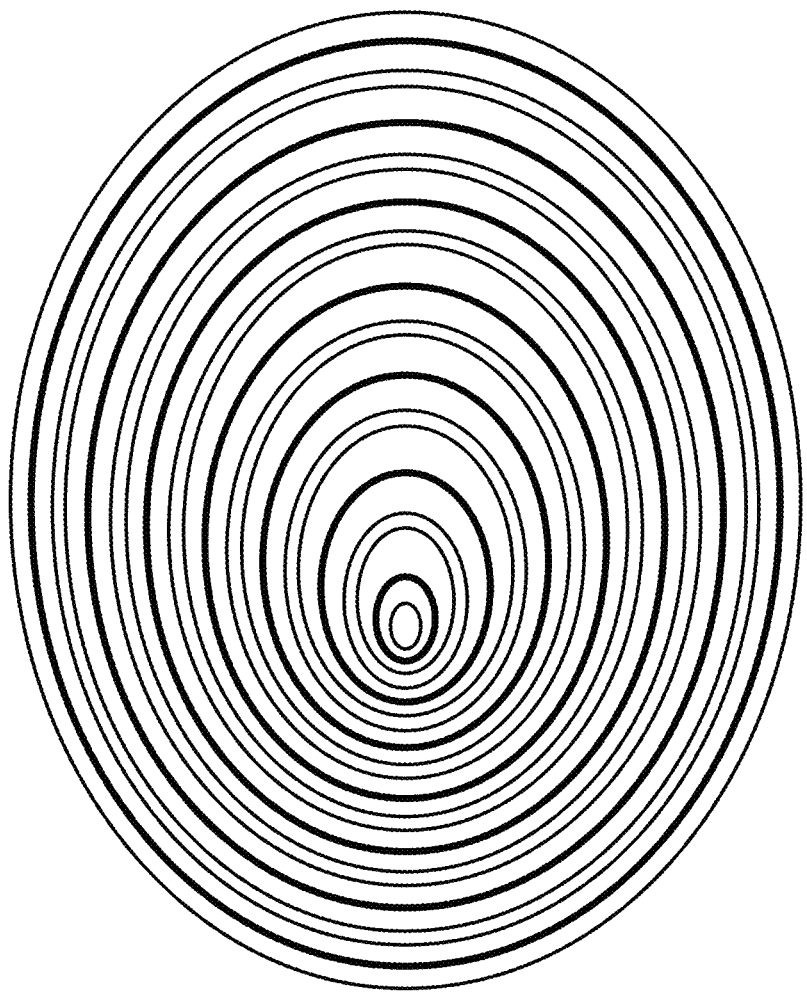
FIG. 22 depicts eccentric annular rolls in a cylindrical vessel in some embodiments.

FIG. 22 depicts eccentric annular rolls in a cylindrical vessel 106 in some embodiments. Axisymmetric roll patterns may be susceptible to a particular instability which may manifest itself more appreciably as the Rayleigh number increases.

It will be appreciated that the use of shapes or surfaces within or on the base and/or walls of the vessel may promote bubble nucleation for the onset of more rapid boiling. Square edges such as those depicted in FIGS. 7B, 8, and 14B may assist as nucleation points. Barbs, points, and/or roughened surfaces on the inner base or inner walls of the vessel may also be utilized as nucleation points. Bubble nucleation may also contribute to, or induce, convection in the contained fluid.

The present invention is described above with reference to exemplary embodiments. It will be appreciated that various modifications may be made and other embodiments can be used without departing from the broader scope of the present invention. Therefore, these and other variations upon the exemplary embodiments are intended to be covered by the present invention.

We claim:

1. An article of manufacture comprising:
   a wall portion having a wall inner surface and a wall outer surface;
   a base portion having a base inner surface and a base outer surface, at least a portion of the wall portion and the base portion forming a vessel to retain fluid therein, at least part of the base portion configured to receive heat from a heating source; and
   multiple sets of shaped portions, each set of shaped portions being a separate instance of a pattern of shaped portions, each separate instance of the pattern of shaped portions being located next to at least one other instance of the pattern of shaped portions, each shaped portion of the multiple sets of shaped portions being a post, each post of at least one separate instance of the pattern of shaped portions being adjacent to at least another post of the at least one separate instance of the pattern of shaped portions, each post extending above the base inner surface, sides of posts not being connected to any other posts, the multiple sets of shaped portions to assist in uneven heat transfer from the heating source to the fluid retained in the article of manufacture, wherein at least a subset of the multiple sets of shaped portion are configured to assist in formation of G-cell convection cells in the surface of the fluid in the article of manufacture.

2. The article of manufacture of claim 1, wherein the multiple sets of shaped portions assist to induce creation of a plurality of convection cells in contact with a surface of the fluid which increases heat transfer from the heating source to the fluid.

3. The article of manufacture of claim 1, wherein the article of manufacture is a pan.

4. The article of manufacture of claim 1, wherein the article of manufacture is a skillet.

5. The article of manufacture of claim 1, wherein the base portion comprises at least two different metals.

6. The article of manufacture of claim 1, wherein at least a subset of the multiple sets of shaped portions are configured to assist in uneven heat transfer in the fluid of the article of manufacture and decrease time needed to heat the fluid to a desired temperature.

7. The article of manufacture of claim 1, wherein at least a subset of the multiple sets of shaped portions are configured to assist in creation of at least one two-armed spiral that rotates in the fluid.

8. The article of manufacture of claim 7, wherein the at least a subset of the multiple sets of shaped portions are configured to induce one or more dislocations in any of the at least one two-armed spiral.

9. The article of manufacture of claim 1, wherein at least a subset of the multiple sets of shaped portions are configured to assist in creation of a plurality of three-dimensional cells in the fluid in the article of manufacture.

10. The article of manufacture of claim 1, wherein at least a subset of the multiple sets of shaped portions are configured to assist in creation of a plurality of three-dimensional cells in contact with the surface of the fluid in the article of manufacture.

11. The article of manufacture of claim 1, wherein at least a subset of the multiple sets of shaped portions are configured to provide nucleation points to assist and promote bubble nucleation for an onset of rapid boiling.

12. The article of manufacture of claim 11, wherein the nucleation points assist with an onset of rapid heating.

13. The article of manufacture of claim 1, wherein the heating source is within the base portion.

14. The article of manufacture of claim 2, wherein the plurality of convection cells are a plurality of polygonal convection cells.

15. The article of manufacture of claim 2, wherein the plurality of convection cells are a plurality of hexagonal convection cells.

16. The article of manufacture of claim 1, wherein the article of manufacture is a pot.

17. The article of manufacture of claim 1, wherein the article of manufacture is a wok.

18. The article of manufacture of claim 1, wherein the article of manufacture is a griddle.

19. The article of manufacture of claim 1, wherein a top of each post is a peak and the base inner surface is a valley.

20. A method comprising:
receiving one or more metals; and
forming the metals into a pan, the pan including a wall portion, a base portion, and multiple sets of shaped portions, the wall portion having a wall inner surface and a wall outer surface, the base portion having a base inner surface and a base outer surface, at least a portion of the wall portion and the base portion forming a vessel, each set of shaped portions being a separate instance of a pattern of shaped portions, each separate instance of the pattern of shaped portions being located next to at least one other instance of the pattern of shaped portions, each shaped portion of the multiple sets of shaped portions being a post, each post of at least one separate instance of the pattern of shaped portions being adjacent to at least another post of the at least one separate instance of the pattern of shaped portions, each post extending above the base inner surface, sides of posts not being connected to any other posts, the multiple sets of shaped portions to assist in uneven heat transfer from a heating source to a substance retained in the article of manufacture, wherein at least a subset of the multiple sets of shaped portion are configured to assist in formation of G-cell convection cells in the surface of the fluid in the article of manufacture.

21. The article of manufacture of claim 1, further comprising a second set of shaped portions, each of the second set of shaped portions including posts that have a polygonal perimeter.

22. The article of manufacture of claim 21, wherein the polygonal perimeter is a hexagon.

* * * * *